(12) United States Patent
Kobayashi et al.

(10) Patent No.: US 9,930,273 B2
(45) Date of Patent: Mar. 27, 2018

(54) IMAGE PICKUP APPARATUS, IMAGE PICKUP SYSTEM, AND CONTROL METHOD FOR THE IMAGE PICKUP APPARATUS FOR CONTROLLING TRANSFER SWITCHES

(71) Applicant: CANON KABUSHIKI KAISHA, Tokyo (JP)

(72) Inventors: Masahiro Kobayashi, Tokyo (JP); Yusuke Onuki, Fujisawa (JP); Masaaki Minowa, Kawasaki (JP); Kazunari Kawabata, Kawasaki (JP); Hiroshi Sekine, Kawagoe (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/389,166

(22) Filed: Dec. 22, 2016

(65) Prior Publication Data

US 2017/0187968 A1 Jun. 29, 2017

(30) Foreign Application Priority Data

Dec. 28, 2015 (JP) ................................. 2015-255995

(51) Int. Cl.
*H04N 5/353* (2011.01)
*H04N 5/378* (2011.01)

(52) U.S. Cl.
CPC ............. *H04N 5/353* (2013.01); *H04N 5/378* (2013.01)

(58) Field of Classification Search
CPC .................................. H04N 5/353; H04N 5/378
See application file for complete search history.

(56) References Cited

U.S. PATENT DOCUMENTS

| | | | | |
|---|---|---|---|---|
| 7,153,719 B2 * | 12/2006 | Patrick | .............. | H01L 27/14609 257/E21.617 |
| 7,605,440 B2 * | 10/2009 | Altice | ................ | H01L 27/1463 257/113 |
| 7,687,832 B2 * | 3/2010 | Patrick | .............. | H01L 27/14609 257/215 |
| 8,115,848 B2 * | 2/2012 | Onuki | .............. | H01L 27/14609 348/308 |
| 8,482,642 B2 * | 7/2013 | Rysinski | ............ | H04N 5/37452 250/208.1 |
| 8,551,801 B2 * | 10/2013 | Hashimoto | ............. | H01L 31/18 438/57 |
| 8,716,719 B2 * | 5/2014 | Matsumura | ....... | H01L 27/14612 257/293 |

(Continued)

FOREIGN PATENT DOCUMENTS

| | | |
|---|---|---|
| JP | 2004-111590 A | 4/2004 |
| JP | 2011-188410 A | 9/2011 |

*Primary Examiner* — Nicholas Giles
(74) *Attorney, Agent, or Firm* — Canon U.S.A., Inc. IP Division

(57) ABSTRACT

A photoelectric conversion unit in each of a plurality of pixels starts accumulation of charges at a first time and is controlled to be turned on after the first time and to be thereafter turned off at a second time to transfer the charges to a holding unit. A second transfer switch in at least one of the pixels is controlled to be turned on at a third time and a fourth time after the second time to transfer the charges held in the holding unit to an amplification unit, and a first transfer switch in the at least one of the pixels is maintained to be in an off state during a period from the third time to a fourth time.

17 Claims, 15 Drawing Sheets

(56) References Cited

U.S. PATENT DOCUMENTS

| | | | | |
|---|---|---|---|---|
| 2007/0235827 A1* | 10/2007 | Altice | ............... | H01L 27/14609 |
| | | | | 257/428 |
| 2009/0108176 A1* | 4/2009 | Blanquart | .............. | H04N 5/353 |
| | | | | 250/208.1 |
| 2009/0284632 A1* | 11/2009 | Onuki | ............... | H01L 27/14609 |
| | | | | 348/302 |
| 2010/0165167 A1* | 7/2010 | Sugiyama | ............ | H04N 5/3597 |
| | | | | 348/311 |
| 2012/0044396 A1* | 2/2012 | Rysinski | ................ | H04N 5/353 |
| | | | | 348/296 |
| 2012/0301989 A1* | 11/2012 | Hashimoto | ............. | H01L 31/18 |
| | | | | 438/57 |
| 2014/0077283 A1* | 3/2014 | Lenchenkov | ..... | H01L 27/14609 |
| | | | | 257/292 |

* cited by examiner

IMAGE PICKUP APPARATUS, IMAGE PICKUP SYSTEM, AND CONTROL METHOD FOR THE IMAGE PICKUP APPARATUS FOR CONTROLLING TRANSFER SWITCHES

BACKGROUND

Field of the Disclosure

The present disclosure relates to an image pickup apparatus having a global electronic shutter, an image pickup system, and a control method for the image pickup apparatus.

Description of the Related Art

In recent years, a global electronic shutter has been proposed for a complementary metal-oxide semiconductor (CMOS) image sensor. For example, image pickup apparatuses described in Japanese Patent Laid-Open No. 2004-111590 and Japanese Patent Laid-Open No. 2011-188410 use the global electronic shutter to avoid distortion of a fast-moving object image.

In the image pickup apparatus described in Japanese Patent Laid-Open No. 2004-111590, all charges generated by photoelectric conversion are accumulated in a charge generation unit, and thereafter, the charges are transferred at the same time from a photoelectric conversion unit to a charge accumulation unit in all pixels. As a result, the global electronic shutter is realized.

In the image pickup apparatus described in Japanese Patent Laid-Open No. 2011-188410, to correct a pseudo signal that may be generated in a first charge accumulation unit, a configuration is adopted in which a signal equivalent to the pseudo signal can be obtained from a second charge accumulation unit. During a period in which the first charge accumulation unit holds the charges, the signal equivalent to the pseudo signal is read out by driving the second charge accumulation unit. Japanese Patent Laid-Open No. 2011-188410 describes that it is possible to correct the signal held in the first charge accumulation unit by using the thus obtained signal indicating the pseudo signal component.

However, according to the technique described in Japanese Patent Laid-Open No. 2011-188410, an accuracy of the signal for the correction is not sufficient in some cases.

SUMMARY

The present disclosure has been made in view of the above-described circumstances, and the present disclosure provides an image pickup apparatus that may obtain the signal for the correction at a still higher accuracy.

An image pickup apparatus according to an aspect of the present disclosure includes a plurality of pixels, each of the plurality of pixels including a photoelectric conversion unit configured to perform accumulation of charges generated by incident light, a holding unit configured to hold the charges, an amplification unit configured to output a signal based on the charges, a first transfer switch configured to transfer the charges from the photoelectric conversion unit to the holding unit, and a second transfer switch configured to transfer the charges from the holding unit to the amplification unit, in which the photoelectric conversion unit in each of the plurality of pixels starts the accumulation of the charges at a first time, the first transfer switch in each of the plurality of pixels is controlled to be turned on after the first time and to be thereafter turned off at a second time to transfer the charges accumulated in the photoelectric conversion unit to the holding unit, the second transfer switch in at least one pixel among the plurality of pixels is controlled to be turned on at a third time after the second time to transfer the charges held in the holding unit to the amplification unit, the second transfer switch in the at least one pixel is controlled to be turned on at a fourth time after the third time to transfer the charges held in the holding unit to the amplification unit, and the first transfer switch in the at least one pixel is maintained to be in an off state during a period from the third time to the fourth time.

Further features of the present disclosure will become apparent from the following description of exemplary embodiments with reference to the attached drawings.

DESCRIPTION OF THE EMBODIMENTS

Figure 1:
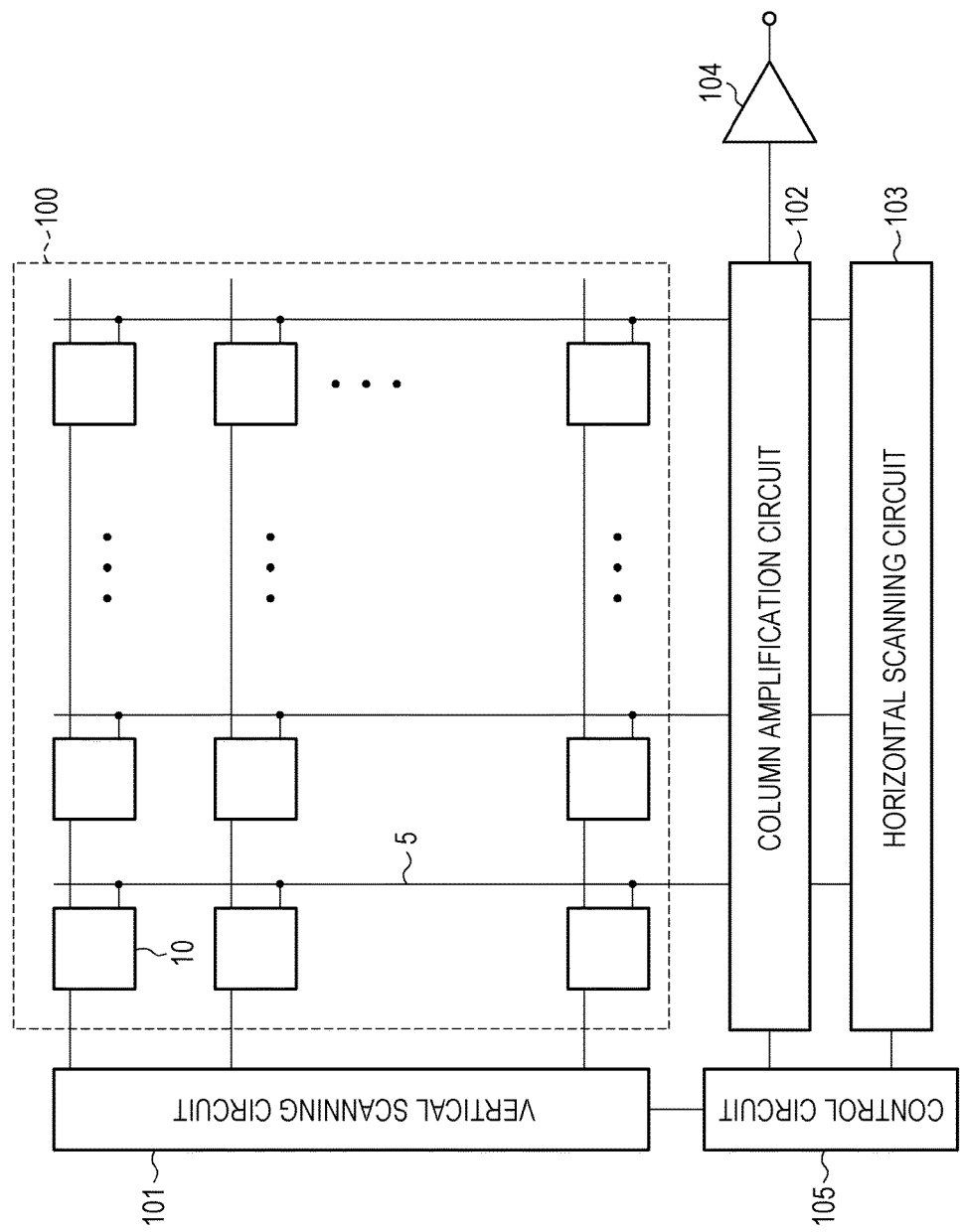
FIG. 1 is a block diagram illustrating a schematic configuration of an image pickup apparatus according to one or more aspects of the present disclosure.

An image pickup apparatus according to some exemplary embodiments of the present disclosure is provided with a plurality of pixels, and each of the pixels includes a photoelectric conversion unit, a holding unit configured to hold signal charges, and an amplification unit configured to output a signal based on the charges. The pixel is further provided with a first transfer transistor configured to transfer real signal charges from the photoelectric conversion unit to the holding unit, a second transfer transistor configured to transfer the charges from the holding unit to the amplification unit, and an overflow transistor configured to discharge the charges of the photoelectric conversion unit. According to the above-described configuration, it is possible to perform an image pickup operation that is so-called a global electronic shutter in which periods for photoelectric conversion are matched with one another among the plurality of pixels. An electronic shutter refers to an image pickup operation of electrically controlling accumulation of the real signal charges generated by incident light.

During a first reading period in each of frames, a plurality of second transfer transistors are sequentially turned on, so that the real signal charges in the previous frame are sequentially transferred from the holding unit to the amplification unit (first read). It should be noted that a signal obtained by this first read includes second pseudo signal charges generated in the holding unit in the previous frame in addition to the real signal charges in the previous frame. This accumulation of the second pseudo signal charges will be described below. After the transfer of the real signal charges is ended, the accumulation of first pseudo signal charges is started in the holding unit.

During a second reading period after the end of the first reading period, the plurality of second transfer transistors are sequentially turned on, so that the accumulation of the first pseudo signal charges is ended, and the first pseudo signal charges are sequentially transferred from the holding unit to the amplification unit (second read). The holding unit that has ended the transfer of the first pseudo signal charges starts the accumulation of the second pseudo signal charges and also is put into a state to stand by for the transfer of the real signal charges from the first transfer transistor. Thereafter, the first read is similarly performed in the above-described manner, and the real signal charges and the second pseudo signal charges are read out again.

In this manner, the first read for reading out the real signal charges and the second pseudo signal charges and the second read for reading out the first pseudo signal charges are performed in each of the frames. Herein, the number of signals output during the first and second reading periods may be changed depending on a format of an image output by the image pickup apparatus. For example, in a case where the image pickup apparatus performs imaging of a moving image, the number of signals corresponding to the number of horizontal lines used in one frame may be output. It should be noted that signals do not necessarily need to be output from all the pixels included in the image pickup apparatus. For example, a configuration may be adopted in which signals are output from only part of the pixel in the image pickup apparatus. In this case, time used to perform the read operation may be shortened.

According to some exemplary embodiments of the present disclosure, the accumulation of the first pseudo signal charges and the accumulation of the second pseudo signal charges are performed in the same holding unit. For this reason, as compared with a case where the accumulation of the first pseudo signal charges and the accumulation of the second pseudo signal charges are performed in different elements as described in Japanese Patent Laid-Open No. 2011-188410, it is possible to obtain the signal for correcting the pseudo signal at a still higher accuracy. Therefore, when the correction is performed by using this signal, the image quality degradation caused by pseudo signal charges can be further alleviated. Thus, the image pickup apparatus according to some exemplary embodiments of the present disclosure can obtain the high quality image while the global electronic shutter operation is realized.

According to a first exemplary embodiment, the first and second reading periods may be the same length, but according to some of the other exemplary embodiments, the second reading period for outputting the first pseudo signal charges may be set to be shorter than the first reading period. The charge amount of the pseudo signal charges is lower in many cases with respect to the real signal charges. This is because the time used to perform the read operation may be shortened in the above-described case. Thus, the time used for the one frame can be shortened, so that it is possible to increase a frame rate. In addition, in a case where the frame rate is set to be constant, it is possible to reduce power consumption and reduce noise.

The image pickup apparatus according to one exemplary embodiment of the present disclosure continuously performs the first read for reading out the real signal charges and the second pseudo signal charges and the second read for reading out the first pseudo signal charges in the same row. Since it is possible to continuously obtain the real signal charges and the pseudo signal charges for the one row, it is not necessary to hold the signal for each frame in another storage unit such as a frame memory, and it is possible to simplify a configuration of an image pickup system.

Hereinafter, exemplary embodiments of the present disclosure will be described with reference to the drawings. The present disclosure is not limited to exemplary embodiments described below. For example, part of the configuration according to any one of the exemplary embodiments described below may be added to and combined with another exemplary embodiment. Alternatively, part of the configuration according to any one of the exemplary embodiments may be replaced with part of a configuration according to another exemplary embodiment.

First Exemplary Embodiment

FIG. 1 is a block diagram illustrating a schematic configuration of an image pickup apparatus according to the present exemplary embodiment. The image pickup apparatus is provided with a pixel unit 100, a vertical scanning circuit 101, a column amplification circuit 102, a horizontal scanning circuit 103, an output circuit 104, and a control circuit 105. The pixel unit 100 is provided with a plurality of pixels 10 arranged so as to form a plurality of rows and a plurality of columns. The vertical scanning circuit 101 supplies a control signal for controlling a plurality of transistors included in the pixel 10 to be turned on (conductive state) or off (non-conductive state). A column signal line 5 is provided in each column of the pixel 10, and a signal from the pixel 10 is read out to the column signal line 5 for each column. The column amplification circuit 102 amplifies a pixel signal output to the column signal line 5, and processing such as correlated double sampling processing based on a signal at the time of resetting and a signal at the time of photoelectric conversion in the pixel 10 is performed. The horizontal scanning circuit 103 supplies a control signal for controlling a switch connected to an amplifier of the column amplification circuit 102 to be turned on or off. The output circuit 104 is constituted by a buffer amplifier, a differential amplifier, or the like and outputs the pixel signal from the column amplification circuit 102 to a signal processing unit outside the image pickup apparatus. It should be noted that the column amplification circuit 102 inside the image pickup apparatus may include a function of a signal processing circuit configured to perform signal processing such as correction of a pseudo signal component. In addition, an analog-to-digital (AD) conversion unit may be provided to the image pickup apparatus to output a digital pixel signal.

Figure 2:
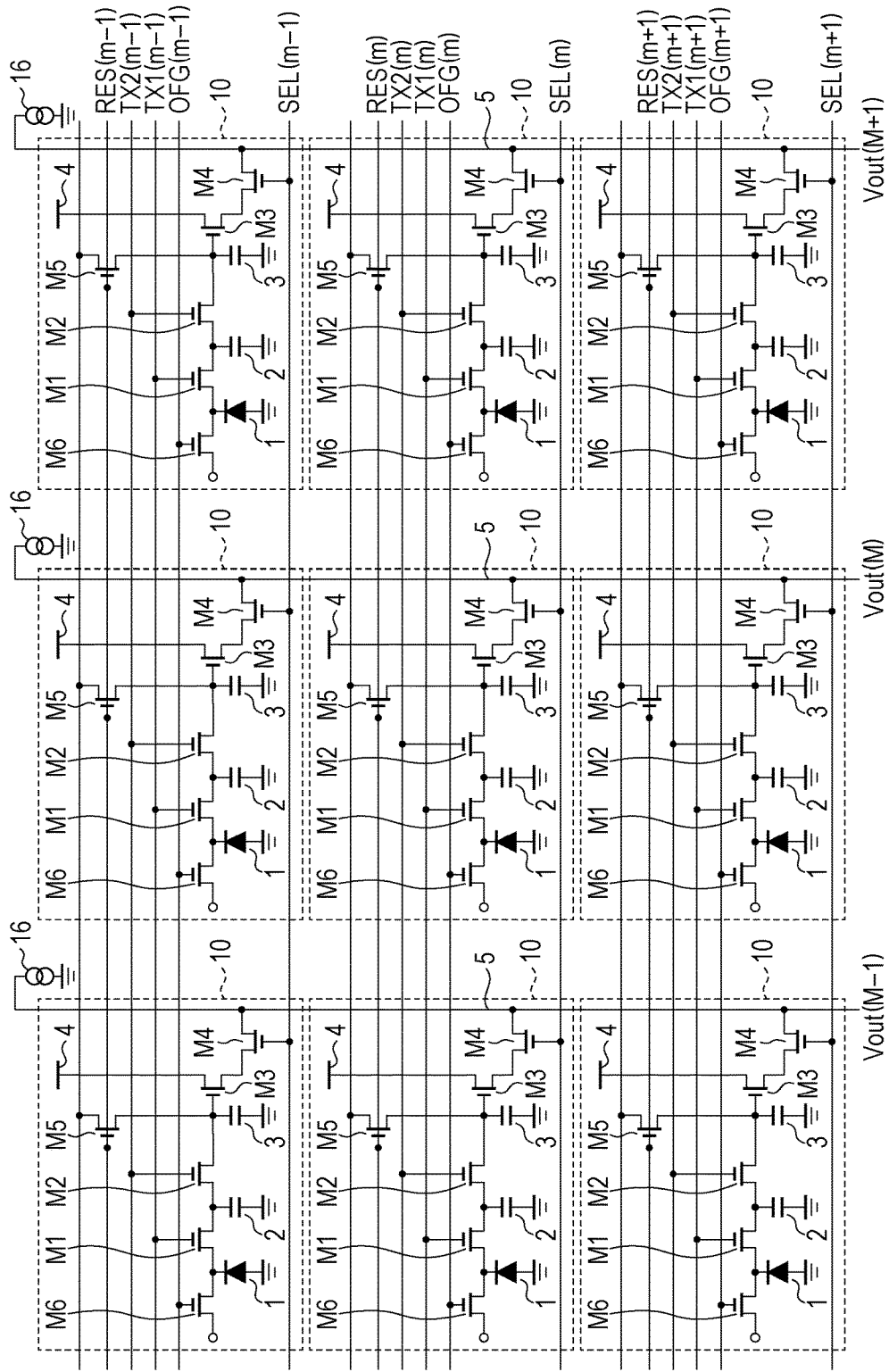
FIG. 2 illustrates an equivalent circuit of a pixel in the image pickup apparatus according to one or more aspects of the present disclosure.

FIG. 2 illustrates an equivalent circuit of the pixel 10 in the image pickup apparatus according to the present exemplary embodiment. FIG. 2 illustrates the nine pixels 10 in three rows×three columns among the plurality of pixels 10 that are two-dimensionally arranged in a row direction and a column direction. However, this is an exemplification illustrating part of the plurality of pixels 10, and the image pickup apparatus may include further more pixels. Each of the pixels 10 is provided with a photoelectric conversion unit 1, a holding unit 2, a floating diffusion region 3, a transfer transistor M1, a second transfer transistor M2, an amplification transistor M3, a selection transistor M4, a reset transistor M5, and an overflow transistor M6.

The photoelectric conversion unit 1 performs photoelectric conversion of incident light and also accumulates the real signal charges generated by the photoelectric conversion. When the first transfer transistor M1 (first transfer switch) is turned on, the first transfer transistor M1 transfers the real signal charges of the photoelectric conversion unit 1 to the holding unit 2. The holding unit 2 holds the real signal charges transferred from the photoelectric conversion unit 1. When the second transfer transistor M2 (second transfer switch) is turned on, the second transfer transistor M2 transfers the charges of the holding unit 2 to the floating diffusion region 3 of the amplification transistor M3. A drain of the amplification transistor M3 is connected to a power source voltage line 4, and a source of the amplification transistor M3 is connected to the column signal line 5 via the selection transistor M4. A constant current source 16 is connected to the column signal line 5. An output signal Vout is output to the column amplification circuit 102 via the column signal line 5 in each column. When the reset transistor M5 (reset switch) is turned on, the reset transistor M5 resets a voltage of the floating diffusion region 3. A source of the overflow transistor M6 is connected to the photoelectric conversion unit 1, and a drain of the overflow transistor M6 is connected to a power source node. A control signal OFG is applied to a gate of the overflow transistor M6. When the overflow transistor M6 (discharge switch) is turned on, the overflow transistor M6 can discharge the charges of the photoelectric conversion unit 1 to an overflow drain such as the power source node. When the overflow transistor M6 is controlled from an on state to an off state, the accumulation of the charges by the photoelectric conversion unit 1 is started. As a result, it is possible to freely set an exposure time.

In the following descriptions, the floating diffusion region 3, the amplification transistor M3, the selection transistor M4, and the reset transistor M5 may be collectively referred to as an output unit. In addition, the floating diffusion region 3 and the amplification transistor M3 function as an amplification unit configured to output a voltage based on the transferred charges. Signal charges obtained from the photoelectric conversion in the photoelectric conversion unit 1 by the incident light are referred to as real signal charges. In contrast to this, signal charges generated by occurrence of photoelectric conversion in a unit other than the photoelectric conversion unit 1 such as, for example, the holding unit 2, charges generated by leakage of the charges, and the like are referred to as pseudo signal charges, which will be described while being distinguished from the above-described real signal charges.

It should be noted that the provision of the overflow transistor M6 is optional, and the overflow transistor M6 may be omitted. In a case where the overflow transistor M6 is omitted, when the first transfer transistor M1 is controlled from the on state to the off state, the accumulation of the charges by the photoelectric conversion unit 1 is started, and it is possible to set the exposure time. According to this configuration, although a restriction is imposed on an operation method for each of the transistors for setting the exposure time, the number of elements is decreased, so that a degree of freedom for the layout is improved.

In addition, as another modified example, a configuration called vertical overflow may be adopted in which a charge discharge destination from the photoelectric conversion unit is set as a semiconductor substrate. According to this configuration, since the number of elements arranged on a substrate surface is decreased, the degree of freedom for the layout is improved.

A common control signal is supplied to the pixels 10 in the same row from the vertical scanning circuit 101. That is, a control signal TX1(m) is supplied to the gate of the first transfer transistor M1 included in each of the plurality of pixels 10 arranged in the m-th row. Similarly, a control signal TX2(m) is supplied to a gate of the second transfer transistor M2 in the m-th row. A control signal SEL(m) is supplied to a gate of the selection transistor M4 in the m-th row. The control signal RES(m) is supplied to a gate of the reset transistor M5 in the m-th row. The control signal OFG(m) is supplied to the gate of the overflow transistor M6 in the m-th row. It should be noted that a subscript m for each of the control signals indicates a row number, and the subscript is assigned in a case where it is necessary to explicate a control signal related to a particular row in the following descriptions.

These transistors are turned on when the respective control signals are at a high level and are turned off when the respective control signals are at a low level. When the control signals in the respective rows are controlled to be turned on or off at the same time, it is possible to control the exposure times in the plurality of pixels 10 to be in the same period of time. According to the above-described configuration, while the holding unit 2 holds the charges, the photoelectric conversion unit 1 can accumulate newly generated charges, and it is possible to perform the global electronic shutter operation in which the periods of the photoelectric conversions in the plurality of pixels are matched with one another.

It should be noted that each of the plurality of pixels 10 includes the amplification unit in the circuit illustrated in FIG. 2, but the plurality of pixels 10 may share a single amplification unit. In addition, the pixel unit 100 may also include a pixel that does not output a signal for constituting an image, such as a light shielded pixel in which the photoelectric conversion unit 1 is light-shielded or a dummy pixel that does not include the photoelectric conversion unit 1, other than effective pixel such as the pixel 10 illustrated in FIG. 2.

Figure 3:
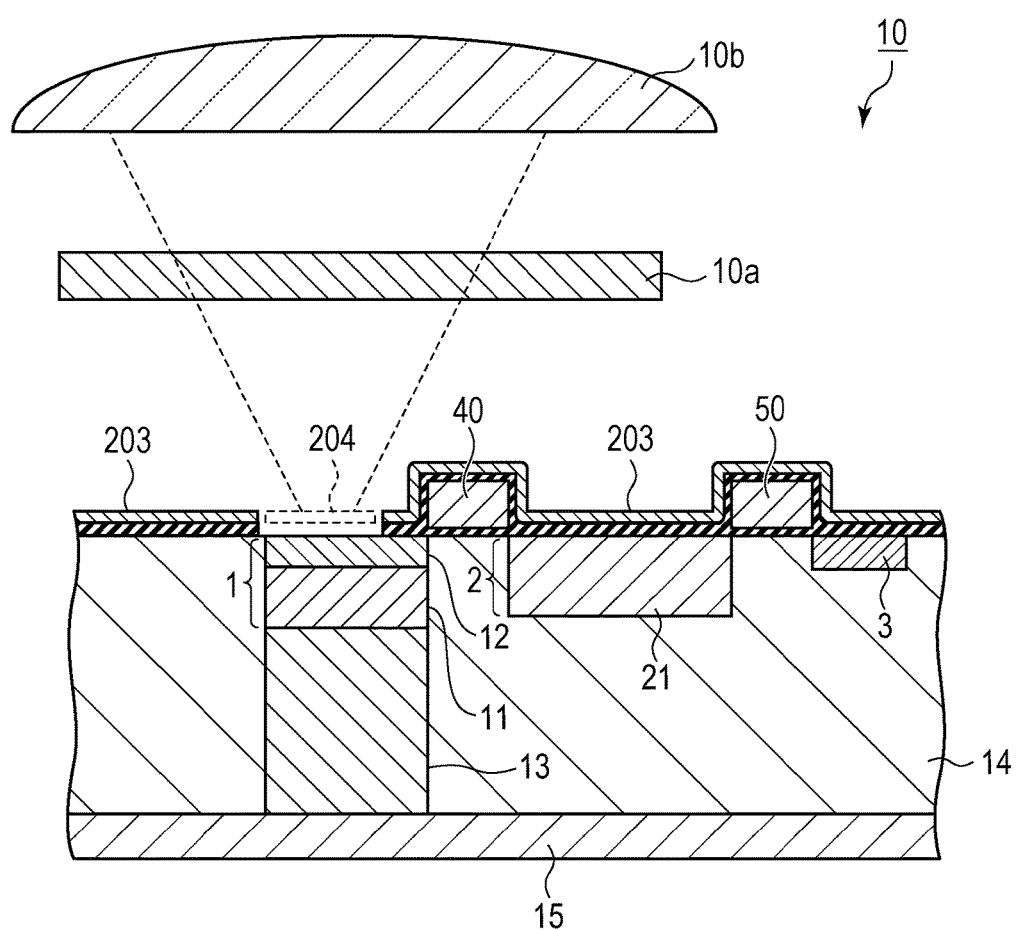
FIG. 3 schematically illustrates a section structure of the pixel in the image pickup apparatus according to one or more aspects of the present disclosure.

FIG. 3 schematically illustrates a section structure of the pixel 10 in the image pickup apparatus according to the present exemplary embodiment.

The photoelectric conversion unit 1 is arranged in a well region 14 of a P-type and includes a semiconductor region 11 of an N-type and a semiconductor region 12 of the P-type. The semiconductor region 11 and the semiconductor region 12 form a PN junction and constitute a buried type photodiode structure. Photoelectric conversion of the incident light is performed in the PN junction, and charges generated by the photoelectric conversion are accumulated in the semiconductor region 11 of the N-type. At this time, since a PN junction interface is buried in the substrate by the semiconductor region 12 of the P-type, noise is suppressed.

A semiconductor region 13 of the N-type is arranged on a lower surface of the photoelectric conversion unit 1. An impurity concentration of the semiconductor region 13 is lower than an impurity concentration of the semiconductor region 11 of the same N-type. As a result, charges generated at a deep position in the semiconductor substrate are captured in the semiconductor region 13, and the noise is suppressed. The semiconductor region 13 may be of the P-type. Furthermore, a semiconductor region 15 of the P-type functioning as a potential barrier with respect to the charges is arranged on a lower surface of the semiconductor region 13.

The holding unit 2 includes a semiconductor region 21 of the N-type arranged in the well region 14 of the P-type. The charges transferred from the photoelectric conversion unit 1 are held by the semiconductor region 21. According to the present exemplary embodiment, an impurity concentration of the semiconductor region 21 is higher than the impurity concentration of the semiconductor region 11 of same the N-type.

A gate electrode 40 is arranged on an upper side of the well region 14 between the semiconductor region 12 and the semiconductor region 21 via a gate insulating film and constitutes the gate of the first transfer transistor M1. In a case where a voltage of the gate electrode 40 is positive, the first transfer transistor M1 is put into the on state, and the charges accumulated in the photoelectric conversion unit 1 are transferred to the holding unit 2. On the other hand, in a case where the voltage of the gate electrode 40 is negative, the first transfer transistor M1 is turned off. A gate electrode 50 is arranged on the upper side of the well region 14 between the semiconductor region 21 and the floating diffusion region 3 via the gate insulating film and constitutes the gate of the second transfer transistor M2. When a negative voltage is applied to the gate electrode 40, holes can be induced on a surface of the semiconductor region 21 of the N-type. As a result, it is possible to suppress the noise generated on the interface.

Herein, in a case where the first transfer transistor M1 is on, the charges may leak from the semiconductor region 21 to generate minute noise in some cases. On the other hand, in a case where the first transfer transistor M1 is off, the holes are induced on the surface of the semiconductor region 21, and the above-described noise is suppressed. Therefore, the first transfer transistor M1 is controlled in a manner that the on period is set to be as short as possible.

A light shielding part 203 is formed of a metal where visible light hardly passes through such as, for example, tungsten or aluminum and shields the semiconductor region including the holding unit 2 from light. The light shielding part 203 includes an opening part 204 on the photoelectric conversion unit 1. A color filter 10a that passes a particular wavelength band of the visible light and a micro lens 10b that condenses the incident light are arranged on the opening part 204.

It should be noted that, although not illustrated in the drawing, the reset transistor M5, the overflow transistor M6, and the like may be arranged on the same substrate together with the photoelectric conversion unit 1. For example, the reset transistor M5, the overflow transistor M6, and the like may be arranged in a depth direction of FIG. 3 or the like. In addition, FIG. 3 illustrates the pixel 10 of a front surface irradiation type as an example of the structure of the pixel 10, but the pixel 10 may be of a rear surface irradiation type. The holding unit 2 is formed on the well region 14 of the P-type, but the holding unit 2 may be formed on a well region of the N-type. In this case, the N-type and the P-type are reversed, and the holes are held by the holding unit 2 instead of the electrons. In addition, the high level and the low level of the control signal supplied to the pixel 10 are reversed.

Figure 4:
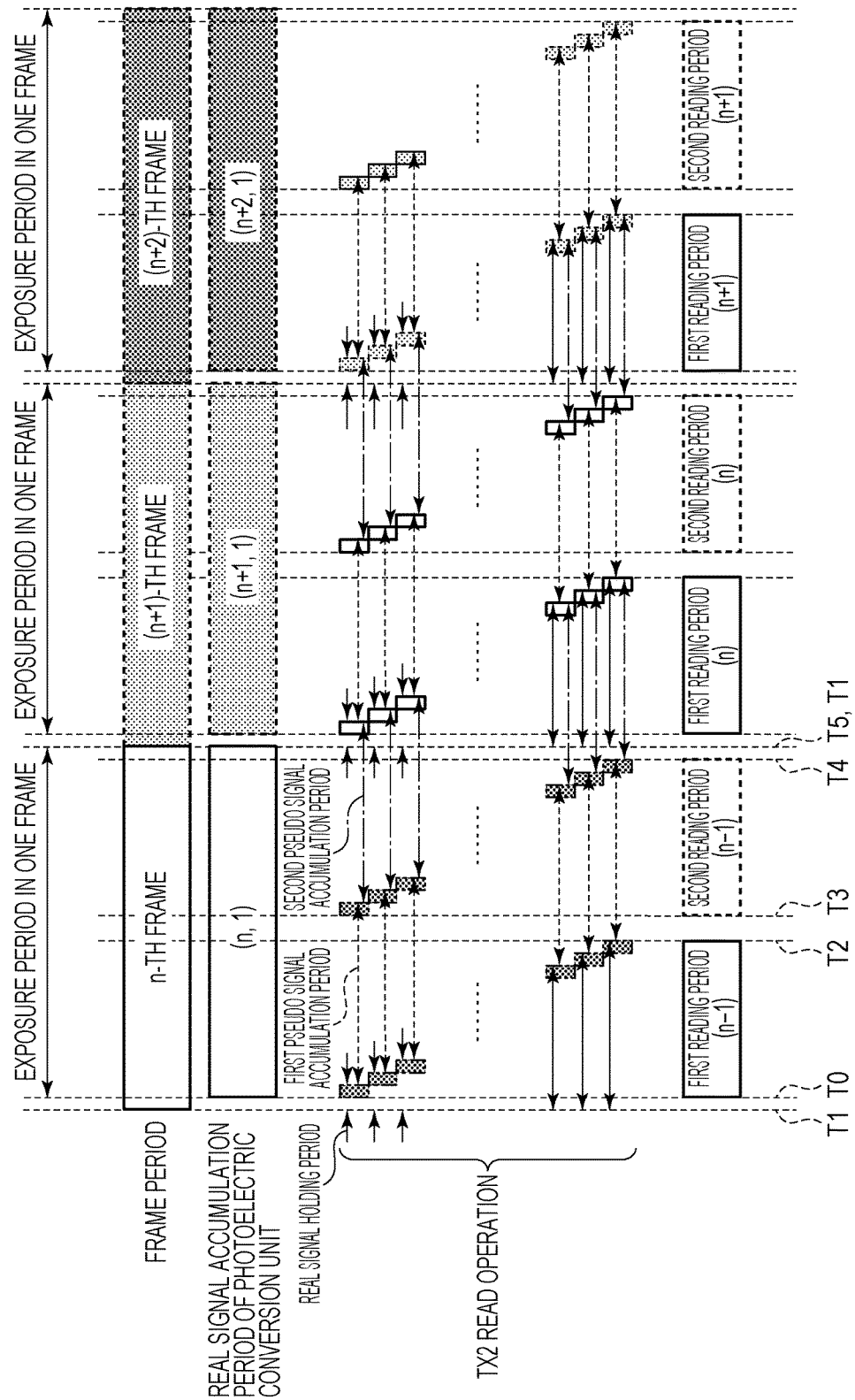
FIG. 4 schematically illustrates an operation of the image pickup apparatus according to one or more aspects of the present disclosure.

FIG. 4 schematically illustrates an operation of the image pickup apparatus according to the present exemplary embodiment, and an image pickup operation from the n-th frame to the (n+2)-th frame is illustrated.

FIG. 4 illustrates the frame period, a real signal accumulation period of the photoelectric conversion unit 1, a read operation based on the control signal TX2, the first reading period, and the second reading period. The "frame period" in the drawing refers to a period in which images of the respective frames constituting a moving image are obtained. The "real signal accumulation period of the photoelectric conversion unit" in the drawing refers to a period in which the photoelectric conversion unit 1 generates and accumulates the charges based on the incident light. The "TX2 read operation" in the drawing refers to a period in which the control signal TX2(m) from the vertical scanning circuit 101 sequentially turns to the high level from the first row, that is, a period in which the second transfer transistor is turned on. The "first reading period" and the "second reading period" in the drawing refer to a period in which the read operation of the pixels is sequentially performed by the scanning from the vertical scanning circuit 101. Herein, the read operation refers to an operation including the charge transfer by the second transfer transistor M2 and the signal output by the amplification transistor M3.

At a time T1, the holding unit 2 holds the real signal charges accumulated during the accumulation period of the photoelectric conversion unit 1 in the (n−1)-th frame and the pseudo signal charges in the (n−1)-th frame generated during a second pseudo signal accumulation period in and after the second reading period in each row. At and after the time T1, the vertical scanning circuit 101 sequentially scans the respective rows. The column amplification circuit 102 outputs the pixel signal based on the real signal charges and the second pseudo signal charges held in the holding unit 2 in accordance with the scanning of the vertical scanning circuit 101. When the output of the pixel signal from the holding unit 2 in each row is ended, a first pseudo signal accumulation period is sequentially started.

At a time after elapse of the first reading period from the time T1, that is, at a time T2, the read operation of the pixel signal in the (n−1)-th frame is completed. Thereafter, the vertical scanning circuit 101 sequentially scans the respective rows again during the second reading period from a time T3 to a time T4. The column amplification circuit 102 sequentially outputs the pixel signal based on the first pseudo signal charges accumulated in the first pseudo signal accumulation period held in the holding unit 2 in accordance with the scanning of the vertical scanning circuit 101. When the output of the pixel signal from the holding unit 2 in each row is ended, the second pseudo signal accumulation period is sequentially started.

In parallel with these operations, at a time T0, the photoelectric conversion unit 1 starts the charge accumulation in the real signal accumulation period in the n-th frame (n, 1). That is, the first read and the second read are performed in parallel with the accumulation of the charges in the photoelectric conversion unit 1. It should be noted that the exposure time may be changed in accordance with an imaging condition such as a luminance of an object. In this case, both the first read and the second read do not necessarily need to be performed in parallel with the accumulation of the charges in the photoelectric conversion unit 1. That is, only one of the first read and the second read may be performed in parallel with the accumulation of the charges, and the accumulation of the charges in the photoelectric conversion unit 1 may also be started after the first read and the second read are ended.

Thereafter, the first transfer transistor M1 is turned on immediately before a time T5, and the first transfer transistor M1 is turned off at the time T5. As a result, the charges accumulated in the photoelectric conversion unit 1 are transferred to the holding unit 2, and the real signal accumulation period in the n-th frame (n, 1) is ended. At this time, the holding unit 2 holds the charges based on the real signal charges in the n-th frame accumulated in the real signal accumulation period and the pseudo signal charges in the n-th frame generated in the second pseudo signal accumulation period in each row. That is, the time T5 is a time corresponding to elapse of the one frame period at the time T1. Thereafter, similarly, the image pickup operation in the (n+1)-th frame, the (n+2)-th frame, . . . is repeatedly executed.

As illustrated in FIG. 4, the accumulation of the charges in the photoelectric conversion unit 1 and the read operation of the charges from the holding unit 2 can be performed in parallel on the basis of the reading method according to the present exemplary embodiment. For this reason, after the end of the exposure period in the one frame, it is possible to start the exposure period in the next frame in a short period of time. Therefore, a period in which the exposure is not performed, that is, a period in which image information is absent can be shortened, so that it is possible to perform the global electronic shutter operation where the image quality is improved.

It should be noted that the read operation is sequentially performed from the first row in FIG. 4, but the read order is not limited to this. It is sufficient when the read operation is performed at least once with respect to each of the pixels in each of the first and second reading periods, and the read order may be varied.

Figure 5:
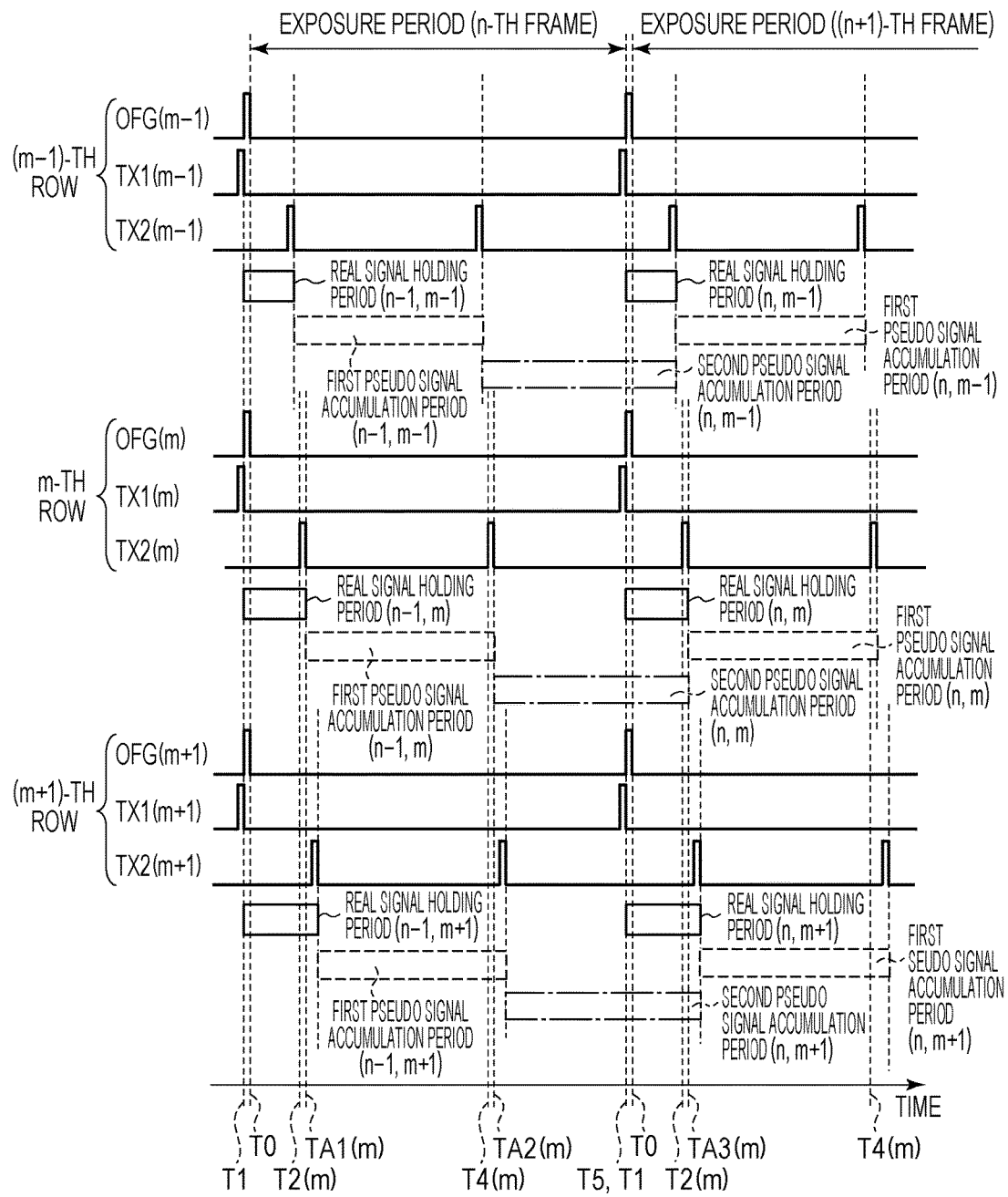
FIG. 5 is a timing chart for control signals of the image pickup apparatus according to one or more aspects of the present disclosure.

FIG. 5 is a timing chart for the image pickup apparatus according to the present exemplary embodiment and illustrates the control signals OFG, TX1, and TX2 in the (m−1)-th to the (m+1)-th rows. As described above, the control signal OFG is a signal applied to the gate of the overflow transistor M6. The control signal TX1 is a signal applied to the gate of the first transfer transistor M1. The control signal TX2 is a signal applied to the gate of the second transfer transistor M2. When the control signal is at the high level, the corresponding transistor is turned on. When the control signal is at the low level, the corresponding transistor is turned off. It should be noted that FIG. 5 illustrates only the control signals in the (m−1)-th to the (m+1)-th rows, but the similar driving operation is also sequentially performed in the other rows.

Herein, the real signal holding period, the first pseudo signal accumulation period, and the second pseudo signal accumulation period in the drawings are assigned with two subscripts. The first subscript indicates a frame number corresponding to the relevant signal. The second subscript indicates a row number. For example, the real signal holding period (n, m) indicates a period in which the signal in the n-th frame with respect to the pixel 10 in the m-th row is held in the holding unit 2. As described above, since the read operation of the signal in the n-th frame is performed in parallel with the exposure in the (n+1)-th frame, at least part of the real signal holding period (n, m) is overlapped with the (n+1)-th frame period.

At a time before the time T1, the control signal TX1 in each row turns to the high level, and the first transfer transistor M1 included in each of the plurality of pixels 10 is turned on at the same time. With this operation, the charges accumulated in the (n−1)-th frame are transferred as the real signal charges from the photoelectric conversion unit 1 to the holding unit 2.

At the time T1, the control signal TX1 in each row turns to the low level, and the first transfer transistor M1 in each of the pixels is turned off. Furthermore, the control signal OFG in each row turns to the high level, and each of the overflow transistors M6 is turned on. With this operation, the charges accumulated in the photoelectric conversion unit 1 are discharged. Thereafter, in the period until the time T0, the overflow transistor M6 is maintained in the on state, and the charges generated in the photoelectric conversion unit 1 are kept to be discharged. At the time T0, the control signal OFG in each row turns to the low level, and the overflow transistor M6 is turned off. From this time, the exposure period in the one frame is started. The photoelectric conversion unit 1 in each of the pixels 10 starts the accumulation of the charges. The real signal accumulation period (n) is started from the time T0. Therefore, it is possible to freely set the time T0 when the exposure is started by controlling the timings for turning the overflow transistor M6 from on to off. It should be noted that the timings for turning the overflow transistor M6 from on to off may be before the timing when the first transfer transistors M1 in each of the pixels are turned off. In this case, the time when the exposure period in the one frame is started is the time when the first transfer transistors M1 are turned off.

In the period from the time T0 to the time T2, that is, the first reading period, the control signals TX2(1), . . . , TX2(m−1), TX2(*m*), TX2(m+1), . . . sequentially turn to the high level, and the second transfer transistors M2 are sequentially turned on. With this operation, the charges in the (n−1)-th frame of the holding unit 2 are sequentially transferred to the floating diffusion region 3 to be read out. It should be noted that, in FIG. 5, for example, the time when the second transfer transistor M2 in the m-th row is turned on is indicated by T2(*m*) in which the row number is denoted by the subscript. The control signal OFG is maintained at the low level from the time T0 when the exposure period in the one frame is started until the time T5 when the next frame period is started. That is, the overflow transistor M6 is maintained in the off state during the period from the time T0 to the time T5. The period during which the overflow transistor M6 is maintained in the off state is equivalent to the exposure period in the n-th frame. The charges are kept to be accumulated in the photoelectric conversion unit 1 during this exposure period.

At the time T2, the first reading period for reading out the pixel signal is ended. After that, in a period from the time T3 to the time T4 (second reading period), the vertical scanning circuit 101 sequentially scans the respective rows again. Specifically, similarly as in the above-described first reading period, the control signals TX2(1), . . . , TX2(m−1), TX2(*m*), TX2(m+1), . . . sequentially turn to the high level, and the second transfer transistors M2 are sequentially turned on. With this operation, the pseudo signal charges accumulated in the first pseudo signal accumulation period are transferred from the holding unit 2 to the floating diffusion region 3. The column amplification circuit 102 sequentially outputs the pixel signal based on the pseudo signal charges accumulated during the first pseudo signal accumulation period held in the holding unit 2 in accordance with the scanning of the vertical scanning circuit 101. When the holding unit 2 in each row ends the output, the second pseudo signal accumulation period is sequentially started.

Thereafter, the first transfer transistor M1 is turned on immediately before the time T5, and the first transfer transistor M1 is turned off at the time T5. As a result, the charges accumulated in the photoelectric conversion unit 1 are transferred to the holding unit 2, and the real signal accumulation period in the n-th frame (n, 1) is needed. At this time, the holding unit 2 holds the charges based on the real signal charges in the n-th frame accumulated during the real signal accumulation period and the second pseudo signal charges generated in the n-th frame during the second pseudo signal accumulation period in each row. The charges are read out during the period from the time T0 to the time T2 in parallel with the exposure in the (n+1)-th frame.

The above-described processing is repeated in the (n+1)-th and subsequent frames. The lengths of the first and second pseudo signal accumulation periods are set to be substantially equal to each other. In other words, the lengths of the first and second pseudo signal accumulation periods are approximately ½ the one frame period. In a case where the lengths are set in the above-described manner, the transfer intervals of the charges from the holding unit 2 to the floating diffusion region 3 become substantially constant.

It should be noted that the first and second pseudo signal accumulation periods are more accurately defined as follows. The first pseudo signal accumulation period spans from a time $TA1(m)$ when the second transfer transistor M2 is turned from on to off in a first signal reading period to a time $TA2(m)$ when the second transfer transistor M2 is turned from on to off in a second signal reading period. The second pseudo signal accumulation period spans from the time $TA2(m)$ described above to a time $TA3(m)$ when the second transfer transistor M2 is turned from on to off in the first signal reading period in the next frame. The time $TA3(m)$ corresponds to a time after elapse of the one frame period from the time $TA1(m)$.

Figure 6:
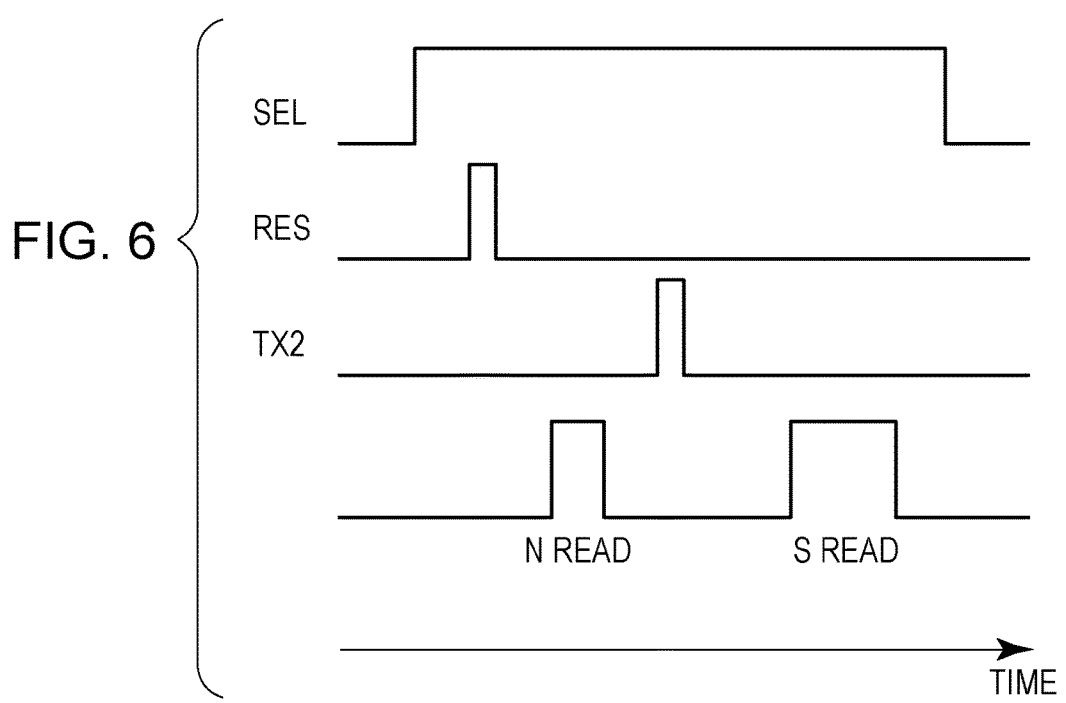
FIG. 6 is a timing chart for the pixel in the image pickup apparatus according to one or more aspects of the present disclosure.

FIG. 6 is a timing chart for control signals according to the present exemplary embodiment, and a pixel signal read operation is represented. FIG. 6 illustrates a control signal SEL supplied to the selection transistor M4, a control signal RES supplied to the reset transistor M5, and the control signal TX2 supplied to the second transfer transistor M2. The second transfer transistor M2, the selection transistor M4, and the reset transistor M5 are turned on when the respectively corresponding control signals are at the high level and are turned off when the respectively corresponding control signals are at the low level.

Hereinafter, the read operation of the pixel signal will be described with reference to FIG. 1 and FIG. 6. First, the vertical scanning circuit 101 sets the control signal SEL at the high level to turn on the selection transistor M4 and selects the pixel 10 from which the signal is read out. Next, the vertical scanning circuit 101 sets the control signal RES at the high level to turn on the reset transistor M5. When the reset transistor M5 is turned on, the voltage of the floating diffusion region 3 is reset to a power source voltage. After the reset transistor M5 is turned off, the column amplification circuit 102 performs the pixel signal read operation (N read) at the time of resetting from the column signal line 5. When the vertical scanning circuit 101 sets the control signal TX2 at the high level to turn on the second transfer transistor M2 and transfer the charges of the holding unit 2 to the floating diffusion region 3. The column amplification circuit 102 performs the pixel signal read operation (S read) of the real signal charges and the pseudo signal charges from the column signal line 5. The thus read pixel signal is subjected to the correlated double sampling processing in the column amplification circuit 102 or the output circuit 104 to be output from the output circuit 104. It should be noted that the correlated double sampling processing may be performed after AD conversion of the pixel signal is performed.

With regard to the image pickup apparatus according to the present exemplary embodiment, the first reading period and the second reading period are substantially equal to each other, and a total of the two reading periods is substantially equal to the one frame period. Therefore, for example, in a case where a moving image at 60 frames per second is imaged, the first and second reading periods are both set as approximately ¹/₁₂₀ seconds. The setting of the first reading period and the second reading period to be substantially equal to each other is optional. For example, the length of the second reading period may be shorter than ½ of the length of the one frame period.

It should be noted that the image pickup apparatus according to the present exemplary embodiment may include an operation mode of a rolling shutter in addition to the operation mode of the global electronic shutter. The rolling shutter is an operation mode in which the accumulation of the charges by the photoelectric conversion unit 1 in the pixel 10 is sequentially started in units of a single row or plural rows. In this operation mode, the first transfer transistors M1 in the pixels are also sequentially turned on in units of a single row or plural rows. In addition, the image pickup apparatus may also include an operation mode of the global electronic shutter based on other methods. For example, the global electronic shutter based on other methods may be an operation mode in which the period in which the photoelectric conversion unit 1 accumulates the charges becomes equal to the exposure period.

As described above, according to the present exemplary embodiment, the signal based on the real signal charges and the second pseudo signal charges is read out during the first reading period, and the signal based on the first pseudo signal charges is read out during the second reading period. Both the first pseudo signal charges and the second pseudo signal charges are based on pseudo signals generated in the same holding unit 2. For this reason, the accuracy of the signal read out during the second reading period is higher as the signal for the correction as compared with a case where these charges are obtained from different elements. Thus, the image pickup apparatus according to the present exemplary embodiment may obtain the signal for the correction at a still higher accuracy in the second reading period.

When the processing for collecting the signal read out during the first reading period is performed by using the signal read out during the second reading period, it is possible to perform the processing for collecting an influence of the pseudo signal charges at a high accuracy, and the image quality degradation derived from the pseudo signal can be alleviated. Hereinafter, an example of this correction method will be described. It should be noted that this correction method may be performed in a signal processing unit in an image pickup system to which the image pickup apparatus is mounted or may be performed in the column amplification circuit 102 in the image pickup apparatus. In addition, this correction method may be performed in digital signal processing with respect to the digital signal after the AD conversion or may be performed with respect to the analog signal before the AD conversion by using an operational amplifier or the like.

A level of the signal based on the real signal charges is set as Vr, a level of the signal based on the first pseudo signal charges is set as Vf1, and a level of the signal based on the second pseudo signal charges is set as Vf2. At this time, the signal read out during the first reading period is set as (Vr+Vf2), and the signal read out during the second reading period is set as Vf1. Herein, both Vf1 and Vf2 are based on the pseudo signals generated in the same holding unit 2. In addition, according to the present exemplary embodiment, since the first reading period and the second reading period are set to be substantially equal to each other, the length of the first pseudo signal accumulation period and the length of the second pseudo signal accumulation period are substantially equal to each other. Therefore, Vf1 and Vf2 are substantially equal to each other. Accordingly, the following Expression (1) is established.

$$(Vr+Vf2)-Vf1 \approx Vr \quad (1)$$

From Expression (1), when the signal Vf1 read out during the second reading period is subtracted from the signal (Vr+Vf2) read out during the first reading period, it is possible to perform the correction of the pseudo signal. As a result, the first pseudo signal charges and the second pseudo signal charges are cancelled out, and the signal Vr based on the real signal charges is obtained. The signal Vf1 used for the subtraction may use not only Vf1 in the same frame but also Vf1 in a different frame as long as the continuity of time is secured. For example, Vf1 obtained in the first pseudo signal accumulation period (n−1) in FIG. 5 may be used for the subtraction of Vr+Vf2 obtained in the (n−1)-th frame or may be used for the subtraction of Vr+Vf2 obtained in the n-th frame.

According to the configuration described in Japanese Patent Laid-Open No. 2011-188410, the signal used for the correction and the pseudo signal mixed into the real signal are based on the charges generated by different elements. For this reason, even when the correction based on the subtraction is performed similarly as described above, values of the signal used for the correction and the pseudo signal are not matched with each other, and a sufficient accuracy is not obtained in some cases. In contrast to this, according to the present exemplary embodiment, both Vf1 and Vf2 are based on the pseudo signal generated in the holding unit 2, and the correction at a still higher accuracy may be performed. Therefore, according to the present exemplary embodiment, the image pickup apparatus or the image pickup system that can obtain the image in which the image quality degradation based on the pseudo signal is further alleviated may be provided.

It should be noted that the above-described correction processing may be performed on the signal obtained by the S read illustrated in FIG. 6 or may be performed on the signal after the correlated double sampling processing has been performed.

Second Exemplary Embodiment

The image pickup apparatus according to a second exemplary embodiment will be described. According to the first exemplary embodiment, the length of the second reading period is substantially equal to the length of the first reading period, but according to the second exemplary embodiment, the length of the second reading period is shorter than the length of the first reading period. In other words, the length of the second reading period is shorter than ½ of the length of the one frame period. Hereinafter, a configuration different from the first exemplary embodiment will be mainly described, and descriptions of a configuration similar to the first exemplary embodiment will be omitted or simplified.

Figure 7:
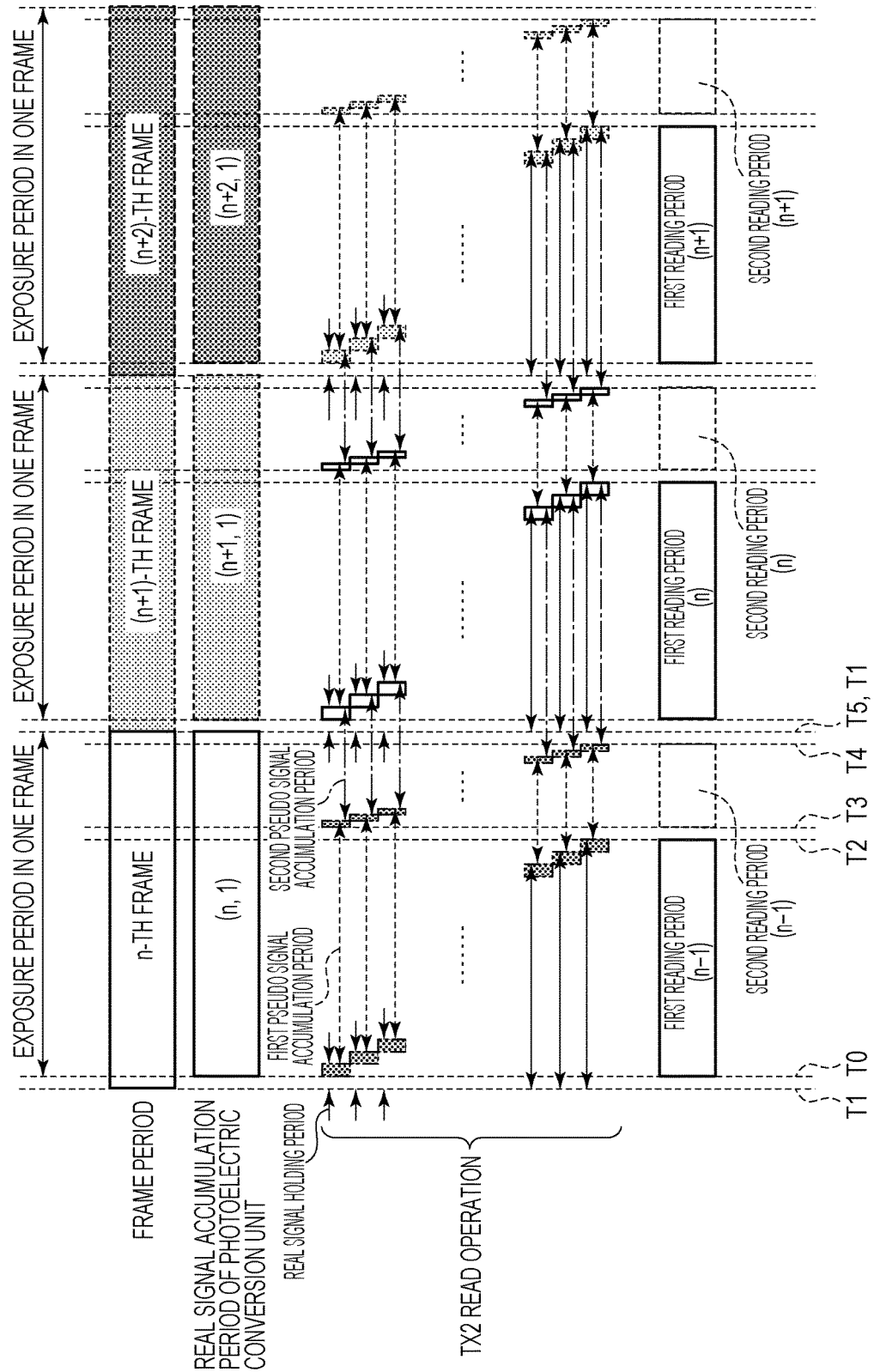
FIG. 7 schematically illustrates the operation of the image pickup apparatus according to one or more aspects of the present disclosure.
Figure 8:
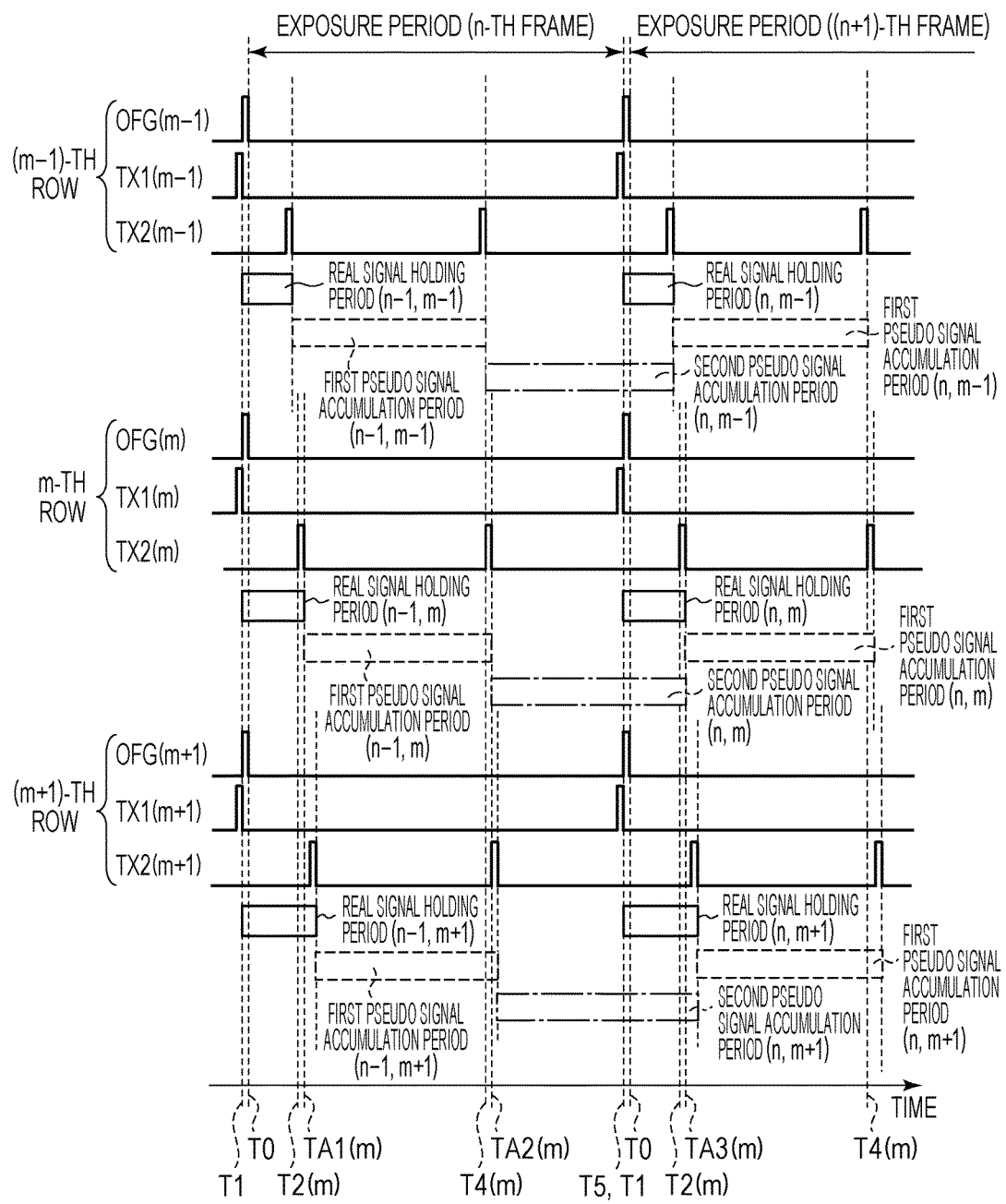
FIG. 8 is a timing chart for the control signals of the image pickup apparatus according to one or more aspects of the present disclosure.

FIG. 7 schematically illustrates the operation of the image pickup apparatus according to the present exemplary embodiment, and FIG. 8 is a timing chart for the image pickup apparatus according to the present exemplary embodiment.

As compared with the operation of FIG. 4 and FIG. 5 according to the first exemplary embodiment, in an operation of FIG. 7 and FIG. 8 according to the present exemplary embodiment, the length of the period from the time T3 to the time T4, that is, the second reading period is shortened. This is because, since the signal output in the second reading period does not include the real signal charges and is based only on the first pseudo signal charges, the signal has a level lower than the signal based on the total of the real signal charges and the second pseudo signal charges output in the first reading period. As a result, since the period for the S read illustrated in FIG. 6 according to the first exemplary embodiment can be shortened, it is possible to shorten the second reading period.

Herein, according to the present exemplary embodiment, while the lengths of the first reading period and the second reading period are different from each other, the length of the two pseudo signal accumulation periods varies in each row. For example, the first pseudo signal accumulation period is longer than the second pseudo signal accumulation period in the first row in FIG. 7, but the second pseudo signal accumulation period is longer than the first pseudo signal accumulation period in the last row. For this reason, it is necessary to perform an adjustment in accordance with a ratio of the accumulation times when the pseudo signal component is corrected.

A different point of the correction method corresponding to the configuration of the present exemplary embodiment from the first exemplary embodiment will be described. The length of the first pseudo signal accumulation period is set as Tf1, and the length of the second pseudo signal accumulation period is set as Tf2. Herein, a time ratio k is set as k=Tf2/Tf1. It is conceivable that the amount of the pseudo signal charges generated in the holding unit 2 is substantially in proportion to the accumulation time, and thus, a ratio Vf2/Vf1 of the pseudo signal charges is substantially the same value as the time ratio k. Therefore, the following Expression (2) is established.

$$(Vr+Vf2)-k \times Vf1 \approx Vr \quad (2)$$

In Expression (2), a value obtained by multiplying the signal Vf1 read out during the second reading period by the time ratio k is subtracted from the signal (Vr+Vf2) read out during the first reading period, so that it is possible to perform the correction of the pseudo signal. As a result, the first pseudo signal charges and the second pseudo signal charges are cancelled out, and the signal Vr based on the real signal charges is obtained.

According to the present exemplary embodiment, not only the effect similar to the first exemplary embodiment can be attained, but also the length of the second reading period is set to be shorter than ½ of the length of the one frame period, so that it is possible to shorten the second reading period. For example, the length of the second reading period is set as approximately ¹⁄₂₄₀ seconds corresponding to half of the length in the case of the first exemplary embodiment, and the frame rate is set as 60 frames per second similarly as in the first exemplary embodiment. In this case, the first reading period can be extended to approximately ¹⁄₈₀ seconds. As a result, power consumption of a read circuit can be reduced, or a period until a potential becomes statically determinate can be further extended, so that it is possible to realize noise reduction. Alternately, in a case where the first reading period is kept as approximately 1/120 seconds, the frame rate can be increased up to 80 frames per second. It should be noted that, according to the first exemplary embodiment, the case has been disclosed in which the length of the second reading period is set as ½ of the length of the one frame period. To put it differently in a form including the conditions of both the first exemplary embodiment and the second exemplary embodiment, the length of the second reading period is set to be lower than or equal to ½ of the length of the one frame period, and the length of the second pseudo signal accumulation period is set to be lower than or equal to ½ of the length of the one frame period.

Third Exemplary Embodiment

The image pickup apparatus according to a third exemplary embodiment will be described. The third exemplary embodiment is different from the first exemplary embodiment in that application of a signal for resetting the holding unit 2 is respectively performed between the first reading period and the second reading period and between the second reading period and the first reading period in the next frame. Hereinafter, a configuration different from the first exemplary embodiment will be mainly described, and descriptions of a configuration similar to the first exemplary embodiment will be omitted or simplified.

Figure 9:
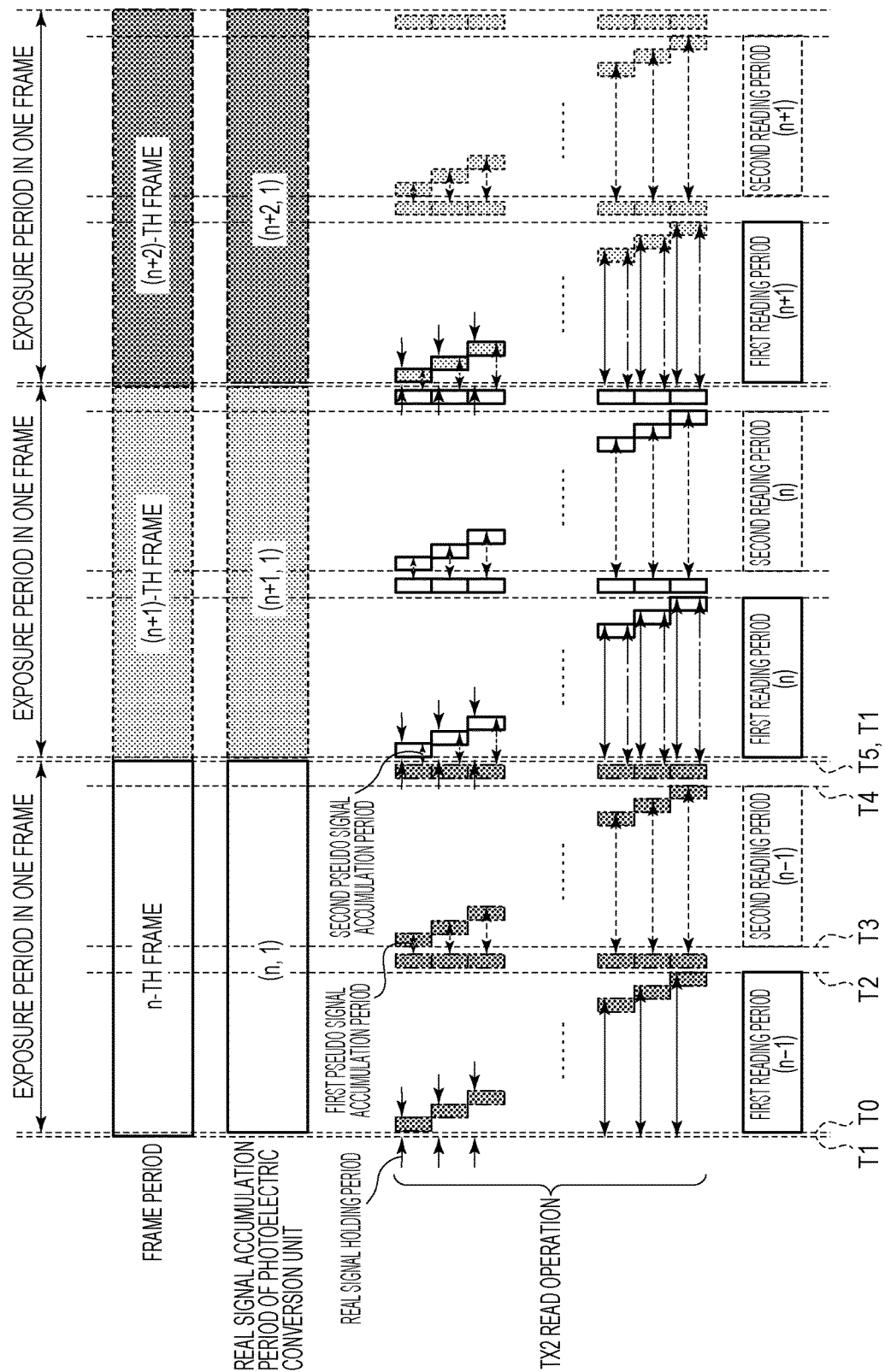
FIG. 9 schematically illustrates the operation of the image pickup apparatus according to one or more aspects of the present disclosure.
Figure 10:
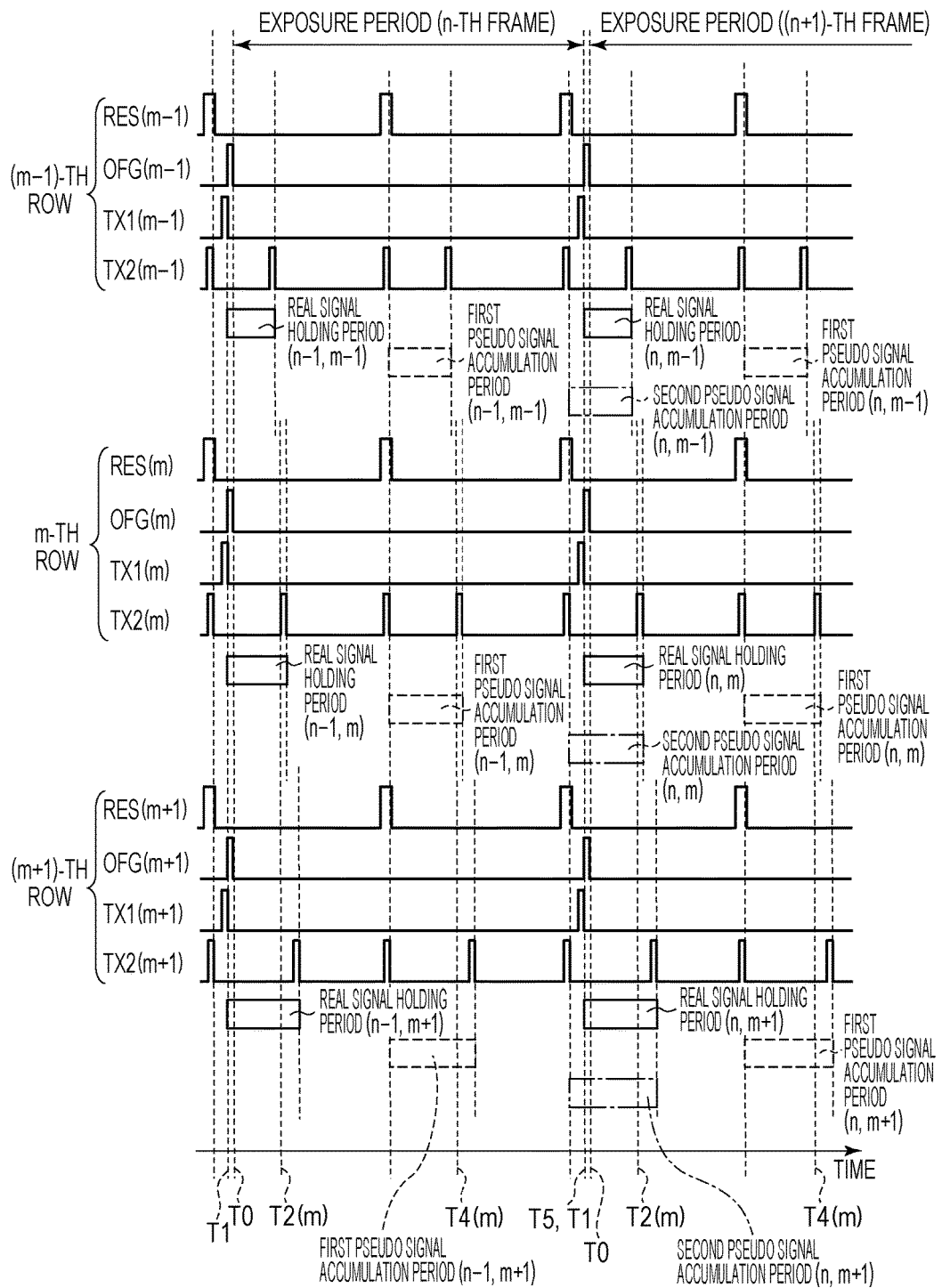
FIG. 10 is a timing chart for the control signals of the image pickup apparatus according to one or more aspects of the present disclosure.

FIG. 9 schematically illustrates the operation of the image pickup apparatus according to the present exemplary embodiment, and FIG. 10 is a timing chart for the image pickup apparatus according to the present exemplary embodiment.

As compared with the operation of FIG. 4 and FIG. 5 according to the first exemplary embodiment, in an operation of FIG. 9 and FIG. 10 according to the present exemplary embodiment, the control signals RES and TX2 for resetting the holding unit 2 are respectively applied to the pixels 10 in all the rows during the period between the time T2 and the time T3 and the period between the time T4 and the time T5. With this operation, both the reset transistor M5 and the second transfer transistor M2 are turned on, and the pseudo signal charges accumulated in the holding unit 2 are reset. When the above-described operation is added, the charges accumulated in the first pseudo signal accumulation period and the second pseudo signal accumulation period can be further decreased. Since the accumulation amount of the pseudo signal is decreased, the noise is reduced, and it is possible to perform the image pickup at a still higher accuracy.

In addition, for example, in a case where a fast moving object or the like is imaged, the incident light amount may largely vary between the first reading period and the second reading period. In the above-described case, the pseudo signal may largely change to decrease the accuracy of the correction in some cases. According to the configuration of the present exemplary embodiment, while the pseudo signal charges are reset, it is possible to alleviate the above-described accuracy decrease in the correction.

Herein, according to the present exemplary embodiment, the lengths of the first and second pseudo signal accumulation periods vary in each row. For example, the lengths of the first and second pseudo signal accumulation periods in the final row are longer as compared with the lengths of the first and second pseudo signal accumulation periods in the first row of FIG. 9. However, according to the present exemplary embodiment, since the length of the first pseudo signal accumulation period is the same as the length of the second pseudo signal accumulation period with respect to each row, it is possible to perform the correction of the pseudo signal by using the technique similar to the first exemplary embodiment. It should be noted that the present exemplary embodiment may be modified in which the length of the first pseudo signal accumulation period is set to be different from the length of the second pseudo signal accumulation period as in the second exemplary embodiment. In this case, it is possible to perform the correction of the pseudo signal by using the technique similar to the second exemplary embodiment.

According to the present exemplary embodiment, not only the effect similar to the first exemplary embodiment can be attained, but also the accuracy of the correction can be further improved while the accumulation amount of the pseudo signal is decreased by the resetting.

Fourth Exemplary Embodiment

The image pickup apparatus according to a fourth exemplary embodiment will be described. The fourth exemplary embodiment is different from the first exemplary embodiment in that a second accumulation period of the photoelectric conversion unit is provided between the second reading period and the first reading period in the next frame. Hereinafter, a configuration different from the first exemplary embodiment will be mainly described, and descriptions of a configuration similar to the first exemplary embodiment will be omitted or simplified.

Figure 11:
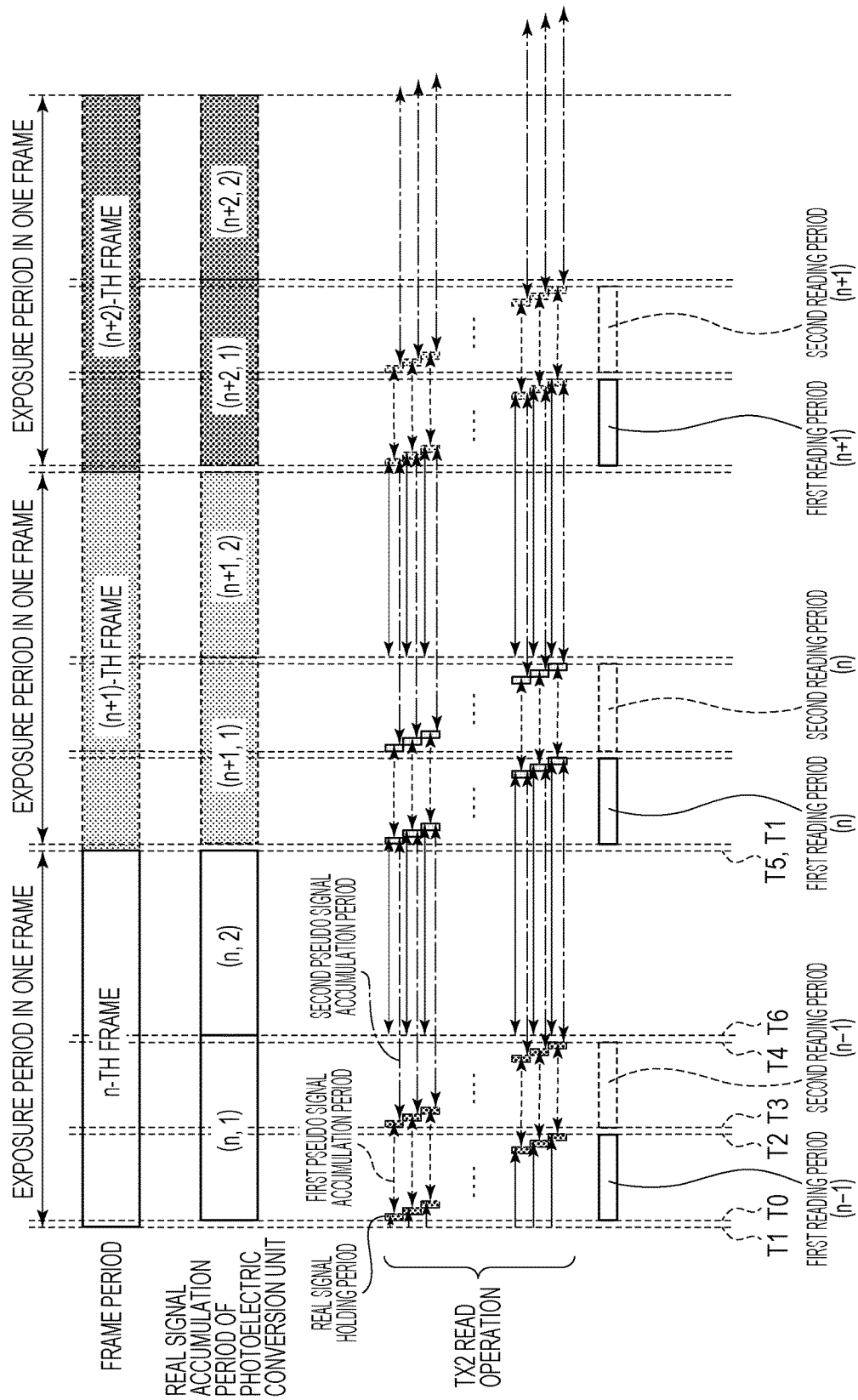
FIG. 11 schematically illustrates the operation of the image pickup apparatus according to one or more aspects of the present disclosure.
Figure 12:
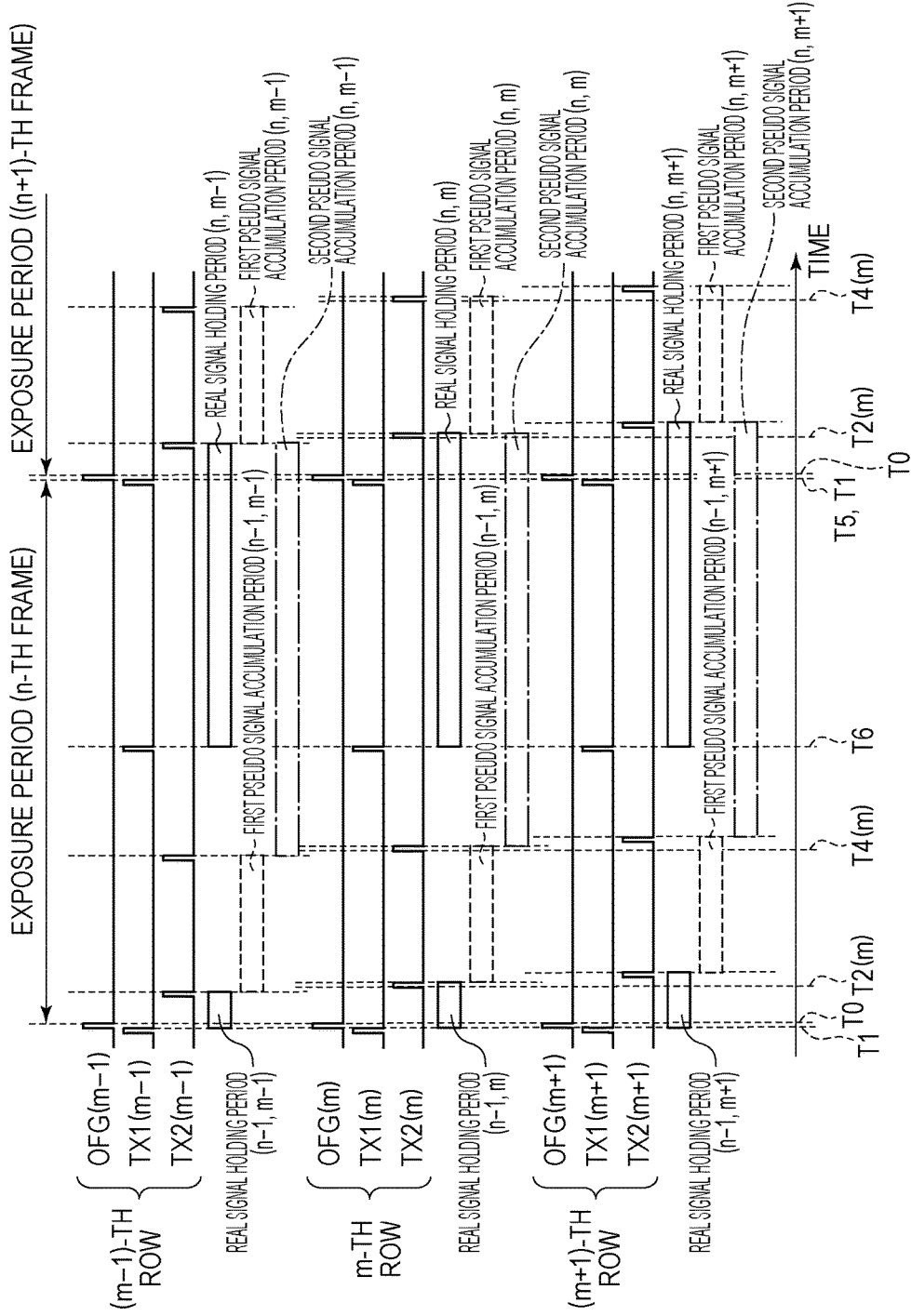
FIG. 12 is a timing chart for the control signals of the image pickup apparatus according to one or more aspects of the present disclosure.

FIG. 11 schematically illustrates the operation of the image pickup apparatus according to the present exemplary embodiment, and FIG. 12 is a timing chart for the image pickup apparatus according to the present exemplary embodiment.

As compared with the operation of FIG. 4 and FIG. 5 according to the first exemplary embodiment, in an operation of FIG. 11 and FIG. 12 according to the present exemplary embodiment, the second accumulation period of the photoelectric conversion unit 1 is provided in the period between the time T4 and the time T5. The second pseudo signal charges are accumulated in the holding unit 2 during the period between the time T4 and the time T5. As illustrated in FIG. 12, the control signal TX1 in each row turns from the low level to the high level in this period, and at a time T6 thereafter, the control signal TX1 turns to the low level. As a result, the first transfer transistor M1 is turned from off to on and turned from on to off again. That is, the transfer of the real signal charges from the photoelectric conversion unit 1 to the holding unit 2 is performed twice in total at a time around the time T6 and a time around the time T5 in the one frame period. In this manner, while the transfer is performed twice also including the transfer at the time around the time T5, the real signal charges can be read out without causing overflow up to an amount twice as high as the saturated charge amount of the photoelectric conversion unit 1, and it is possible to expand the dynamic range. It should be noted that the transfer of the real signal charges from the photoelectric conversion unit 1 to the holding unit 2 can be performed three times or more. That is, as long as the transfer is performed plural times, the number of transfer times can be arbitrarily set. However, as the number of transfer times is increased, the time for the one frame is lengthened. Thus, an appropriate number of transfer times is set by taking into account a trade-off against the frame rate.

Herein, according to the present exemplary embodiment, the length of the first pseudo signal accumulation period is different from the length of the second pseudo signal accumulation period. As illustrated in FIG. 11, the second pseudo signal accumulation period has a length approximately three times as long as the first pseudo signal accumulation period. In this case, while the time ratio k is set as approximately 3, the correction of the pseudo signal can be performed by using the technique similar to the second exemplary embodiment.

According to the present exemplary embodiment, not only the effect similar to the first exemplary embodiment can be attained, but also the number of the times to transfer the real signal charges from the photoelectric conversion unit 1 to the holding unit 2 is set to be plural, so that it is possible to expand the dynamic range.

Fifth Exemplary Embodiment

The image pickup apparatus according to a fifth exemplary embodiment will be described. According to the first exemplary embodiment, the first reading period and the second reading period are respectively set in the different periods. In contrast to this, according to the present exemplary embodiment, the second read is performed immediately after the first read in the reading period in each row, and this aspect is different from the first exemplary embodiment. Hereinafter, a configuration different from the first exemplary embodiment will be mainly described, and descriptions of a configuration similar to the first exemplary embodiment will be omitted or simplified.

Figure 13:
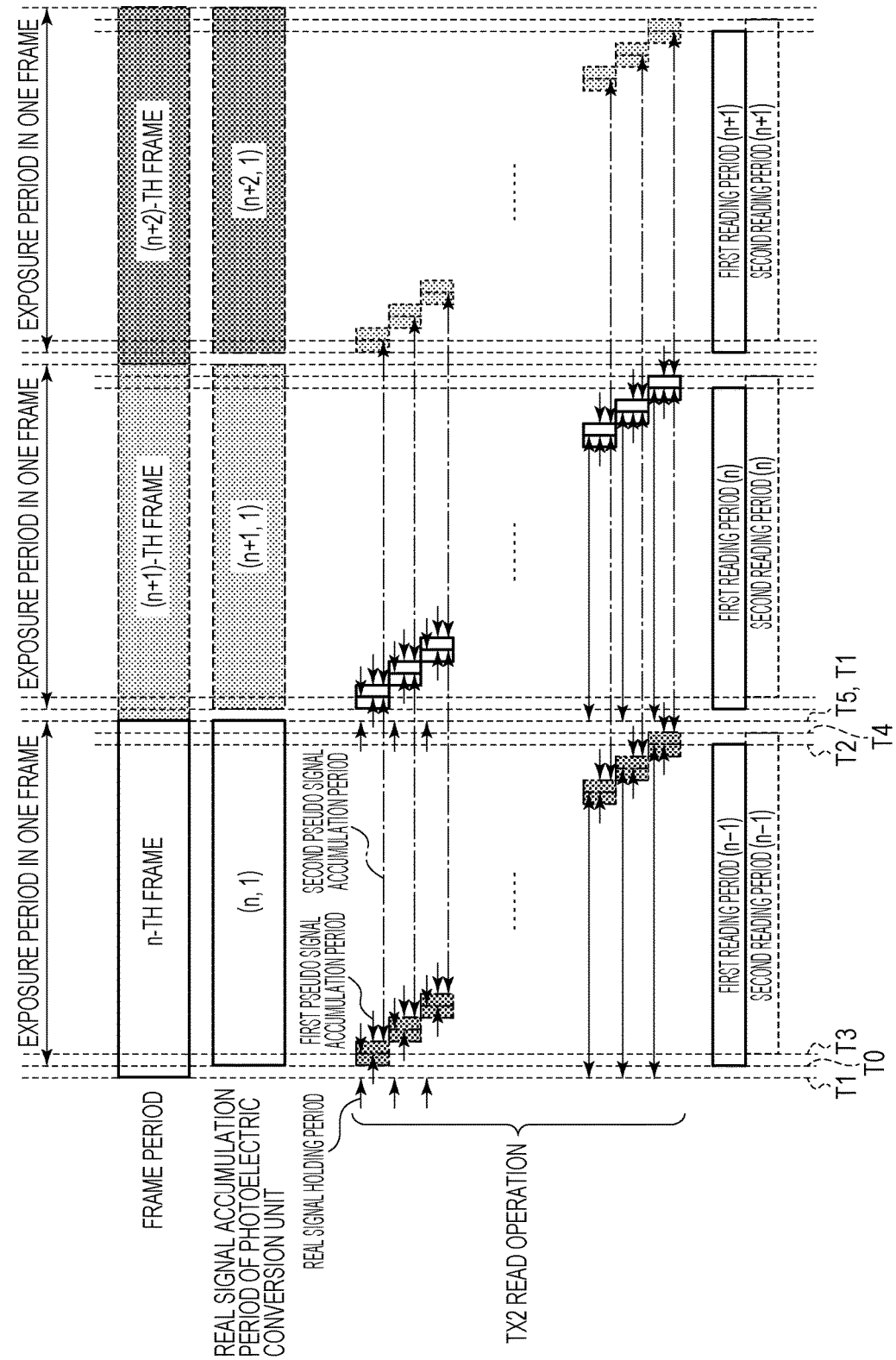
FIG. 13 schematically illustrates the operation of the image pickup apparatus according to one or more aspects of the present disclosure.
Figure 14:
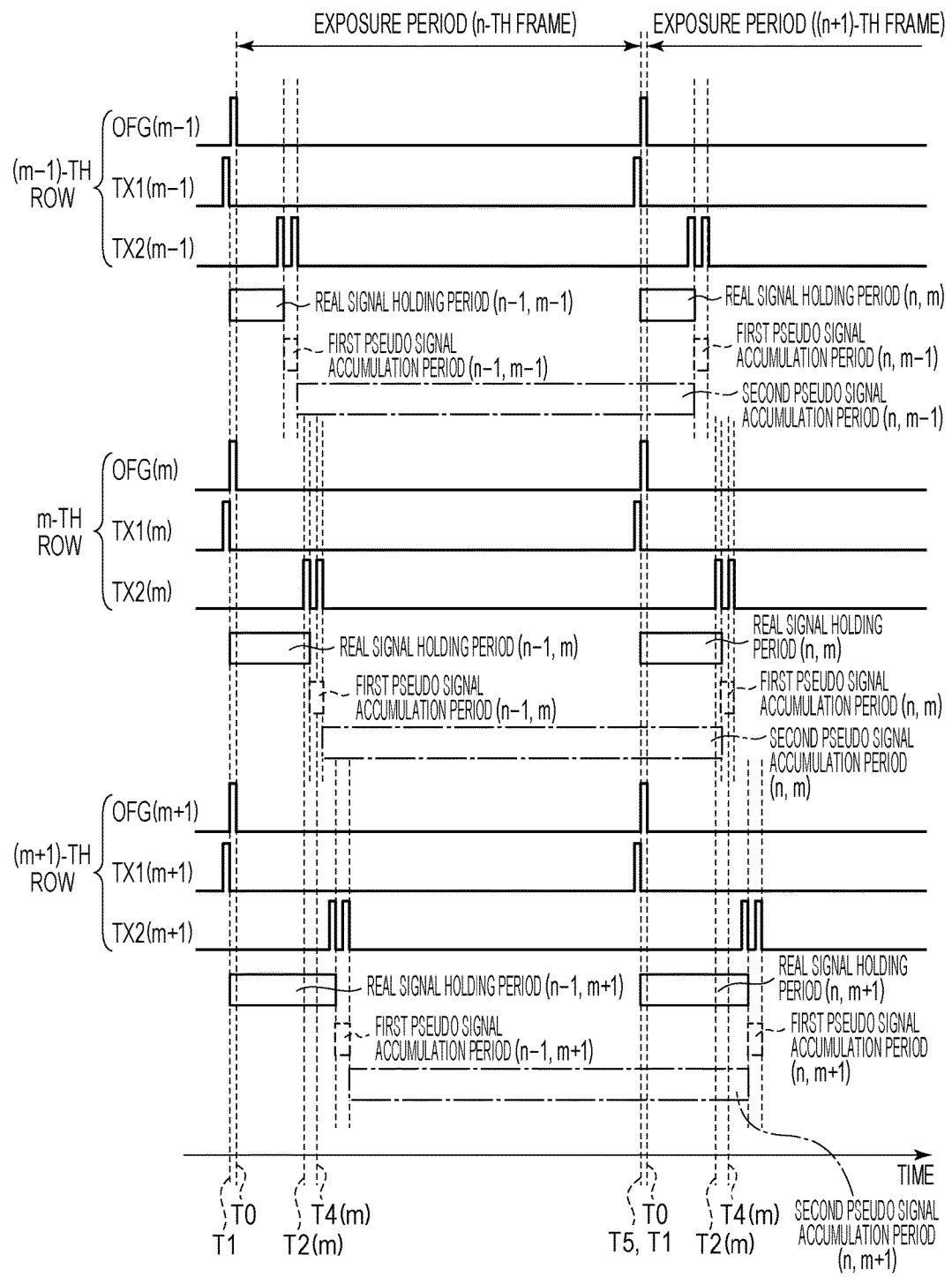
FIG. 14 is a timing chart for the control signals of the image pickup apparatus according to one or more aspects of the present disclosure.

FIG. 13 schematically illustrates the operation of the image pickup apparatus according to the present exemplary embodiment, and FIG. 14 is a timing chart for the image pickup apparatus according to the present exemplary embodiment.

The first reading period and the second reading period are respectively set in the different periods in FIG. 4 and FIG. 5 according to the first exemplary embodiment. In contrast to this, the second reading period is arranged immediately after the first reading period in the reading period in each row in FIG. 13 and FIG. 14 according to the present exemplary embodiment. With this configuration, the image pickup apparatus according to the present exemplary embodiment can continuously obtain the signal (Vr+Vf2) read out by the first read and the signal Vf1 read out by the second read. With the configuration in which the first reading period and the second reading period are set in the different periods as in the first exemplary embodiment, the signal for each frame needs to be temporarily held in a memory such as a frame memory. According to the present exemplary embodiment, in the read operation in one row, the signals can be continuously obtained without performing the transfer in the other row during this read operation. Therefore, a calculation for the correction can be performed when a single memory is provided for each output column, and it is possible to simplify the configuration of the image pickup system.

Herein, according to the present exemplary embodiment, the second pseudo signal accumulation period is longer than the first pseudo signal accumulation period. For this reason, when the time ratio k is set on the basis of the ratio of the accumulation times, the correction of the pseudo signal can be performed by using the technique similar to the second exemplary embodiment.

According to the present exemplary embodiment, not only the effect similar to the first exemplary embodiment can be attained, but also the first read and the second read are continuously performed without performing the transfer in the other row during this period, and it is possible to simplify the configuration of the image pickup system.

Sixth Exemplary Embodiment

Figure 15:
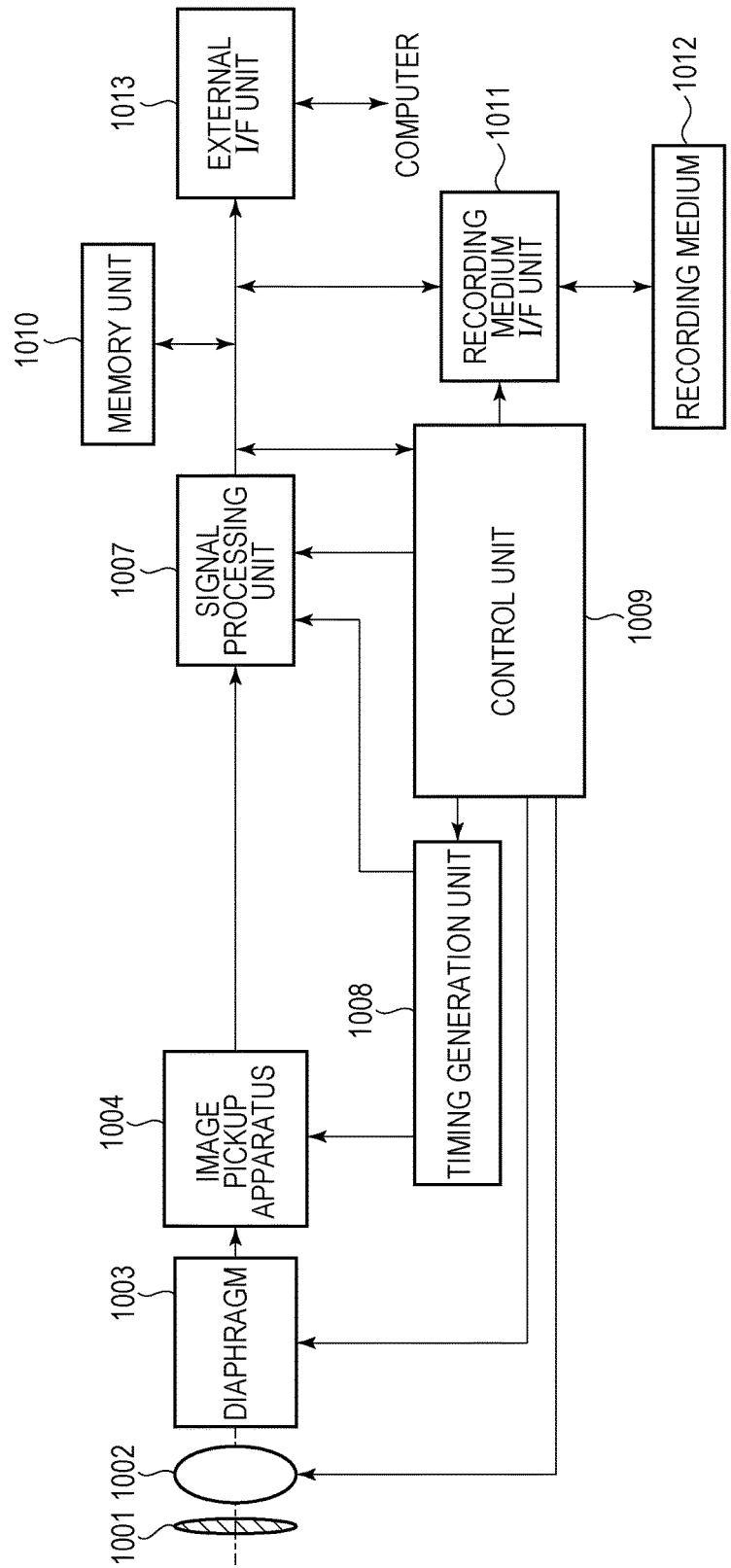
FIG. 15 is a block diagram of an image pickup system according to one or more aspects of the present disclosure.

Hereinafter, an image pickup system according to a sixth exemplary embodiment will be described with reference to FIG. 15. The image pickup system according to the present exemplary embodiment is provided with the image pickup apparatus according to the first to fifth exemplary embodiments. For example, a digital still camera, a digital camcorder, a copier, a facsimile, a mobile phone, an on-vehicle camera, an observation satellite, and the like are exemplified as the image pickup system. In addition, the image pickup system also includes a camera module provided with an optical system such as a lens and the image pickup apparatus. FIG. 15 is a block diagram of the digital still camera as an example of the image pickup system. The image pickup system illustrated in FIG. 15 is provided with a lens protection barrier 1001, a lens 1002, a diaphragm 1003, an image pickup apparatus 1004, and a signal processing unit 1007. The image pickup system is further provided with a timing generation unit 1008, a control unit 1009, a memory unit 1010, a recording medium I/F unit 1011, a recording medium 1012, and an external I/F unit 1013.

The lens protection barrier 1001 protects the lens 1002. The lens 1002 focuses an optical image of the object on the image pickup apparatus 1004. The diaphragm 1003 varies the amount of light that has passed through the lens 1002. The image pickup apparatus 1004 is the image pickup apparatus described according to the first to fifth exemplary embodiments and converts the optical image focused by the lens 1002 into image data. The signal processing unit 1007 performs various corrections or data compression on the image pickup data output from the image pickup apparatus 1004. The timing generation unit 1008 outputs various timing signals to the image pickup apparatus 1004 and the signal processing unit 1007. The control unit 1009 controls the entirety of the digital still camera. The memory unit 1010 temporarily stores image data. The recording medium I/F unit 1011 performs recording and reading with respect to the recording medium 1012. The recording medium 1012 is a detachable recording medium such as a semiconductor memory that performs recording and reading of the image pickup data. The external I/F unit 1013 communicates with an external computer or the like.

It should be noted that the timing signal may be supplied from the outside of the image pickup system, and it is sufficient when the image pickup system according to the present exemplary embodiment is provided with at least the image pickup apparatus 1004 and the signal processing unit 1007 configured to process the image pickup signal output from the image pickup apparatus 1004. The AD conversion unit may be provided on the semiconductor substrate of the image pickup apparatus 1004 and may be provided on a semiconductor substrate different from the semiconductor substrate of the image pickup apparatus 1004. In addition, the image pickup apparatus 1004 and the signal processing unit 1007 may be formed on the same semiconductor substrate. It should be noted that the calculation for the processing of correcting the pseudo signal described according to the first to fifth exemplary embodiments can be performed, for example, within the signal processing unit 1007 in the image pickup system.

Other Exemplary Embodiments

The above-described exemplary embodiments are merely examples of the present disclosure and can be modified and implemented in a range without departing from the gist of the present disclosure. According to the above-described exemplary embodiments, the photoelectric conversion unit 1 that generates the electrons is used, but the photoelectric conversion unit 1 that generates the holes may be used. In this case, a conductive type of the transistor constituting the pixel 10 becomes a reversed conductive type. In addition, the source and the drain of the transistor may be replaced in accordance with the conductive type of the transistor or the like in some cases.

According to the fourth exemplary embodiment, the transfer intervals of the charges from the photoelectric conversion unit 1 to the holding unit 2 are substantially equal to one another, but the respective transfer intervals may also be varied. Furthermore, it is also possible to dynamically control the intervals of the charge transfer in accordance with a luminance of the object in a manner that the transfer intervals may be further shortened in a case where the object is bright, for example.

According to the first to fifth exemplary embodiments, when the first transfer transistor M1 is turned on immediately after the end of the first period for reading out the pixel signal, the first transfer transistor M1 transfers the charges from the photoelectric conversion unit 1 to the holding unit 2. It is sufficient if the timing when the first transfer transistor M1 is turned on is a time after the end of the reading period and may also be a time after elapse of a predetermined time since the reading period has ended.

In addition, the two or more holding units 2 may be provided with respect to the single photoelectric conversion unit 1.

According to the first to fifth exemplary embodiments, the signal read out during the second reading period is used for the correction of the pseudo signal. However, the purpose of the signal read out during the second reading period is not limited to the purpose of the correction of the pseudo signal, and the signal may also be used for purposes other than the correction of the pseudo signal. Hereinafter, as an example of the other purposes, a processing method of using the signal read out during the second reading period for the correction for the dynamic range expansion. It should be noted that this processing may be performed in the signal processing unit 1007 in the image pickup system similarly as in the first to sixth exemplary embodiments and may also be performed in the column amplification circuit 102 in the image pickup apparatus.

The charge amount that can be accumulated by the photoelectric conversion unit 1 in the pixel 10 has an upper limit. In a case where the incident light amount is high, the charges accumulated beyond the upper limit overflow from the photoelectric conversion unit 1. Part of the overflowing charges moves over the first transfer transistor M1 to the holding unit 2. In the above-described case, the signals read out during the first reading period and the second reading period include the charges overflowing from the photoelectric conversion unit 1.

Among the signals based on the overflowing charges, a component included during the first reading period is set as a first excess signal Vs1, and a component included during the second reading period is set as a second excess signal Vs2. At this time, the signal read out during the first reading period is represented as (Vr+Vs1). The signal read out during the second reading period is represented as Vs2. It should be noted that the above-described pseudo signal is ignored while a case is assumed in which a level of the pseudo signal is sufficiently smaller than levels of the real signal and the excess signal. The first excess signal Vs1 and the second excess signal Vs2 are set at a level in accordance with the luminance of the incident light described above and therefore reflect a contrast of the object. Thus, it is possible to use the signal read out during the second reading period for the processing of expanding the dynamic range.

An example of the dynamic range expansion will be described. When the second excess signal Vs2 read out during the second reading period is added to the signal (Vr+Vs1) read out during the first reading period, (Vr+Vs1+Vs2) is obtained. Since Vs1+Vs2 corresponds to the charges overflowing from the photoelectric conversion unit 1 during the exposure period in the one frame, it is possible to obtain a signal beyond the holding upper limit of the charges of the photoelectric conversion unit 1 by this processing. That is, the signal read out during the second reading period is added to the signal read out during the first reading period, and it is therefore possible to expand the dynamic range.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2015-255995 filed Dec. 28, 2015, which is hereby incorporated by reference herein in its entirety.

What is claimed is:
1. An image pickup apparatus comprising:
a plurality of pixels, each of the plurality of pixels including
a photoelectric conversion unit configured to perform accumulation of charges generated by incident light,
a holding unit configured to hold the charges,
an amplification unit configured to output a signal based on the charges,
a first transfer switch configured to transfer the charges from the photoelectric conversion unit to the holding unit, and
a second transfer switch configured to transfer the charges from the holding unit to the amplification unit,
wherein the photoelectric conversion unit in each of the plurality of pixels starts the accumulation of the charges at a first time,
wherein the first transfer switch in each of the plurality of pixels is controlled to be turned on after the first time and to be thereafter turned off at a second time to transfer the charges accumulated in the photoelectric conversion unit to the holding unit,
wherein the second transfer switch in at least one pixel among the plurality of pixels is controlled to be turned on at a third time after the second time to transfer the charges held in the holding unit to the amplification unit,
wherein the second transfer switch in the at least one pixel is controlled to be turned on at a fourth time after the third time to transfer the charges held in the holding unit to the amplification unit, and
wherein the first transfer switch in the at least one pixel is maintained to be in an off state during a period from the third time to the fourth time.

2. The image pickup apparatus according to claim 1,
wherein each of the plurality of pixels further includes a discharge switch configured to discharge the charges of the photoelectric conversion unit, and
wherein the first time is a time when the discharge switch is turned off.

3. The image pickup apparatus according to claim 2, wherein the discharge switch in the at least one pixel is maintained to be in the off state during the period from the third time to the fourth time.

4. The image pickup apparatus according to claim 2, wherein the discharge switch in the at least one pixel is maintained to be in an on state during the period from the third time to the fourth time.

5. The image pickup apparatus according to claim 1, wherein the transfer at the third time is performed in parallel with charge accumulation during a period from the first time to the second time for a next frame.

6. The image pickup apparatus according to claim 1, wherein the transfer at the fourth time is performed in parallel with charge accumulation during a period from the first time to the second time for a next frame.

7. The image pickup apparatus according to claim 1,
wherein the plurality of pixels are arranged so as to form a plurality of rows, and
wherein the at least one pixel is a pixel arranged in a same row among the plurality of rows.

8. The image pickup apparatus according to claim 1,
wherein, while a time when the second transfer switch in the at least one pixel is controlled to be in the off state after the third time is set as a fifth time, and
a time when the second transfer switch in the at least one pixel is controlled to be in the off state after the fourth time is set as a sixth time,
a length of a period from the fifth time to the sixth time is ½ of a length of one frame period or shorter.

9. The image pickup apparatus according to claim 1,
wherein each of the plurality of pixels further includes a reset switch configured to reset a voltage of the amplification unit, and
wherein a period in which both the reset switch and the second transfer switch are turned on is set during the period from the third time to the fourth time.

10. The image pickup apparatus according to claim 1, wherein the first transfer switch in each of the plurality of pixels performs the transfer plural times including the control to be turned off at the second time during a period from the fourth time in a previous frame to the second time.

11. The image pickup apparatus according to claim 1,
wherein the plurality of pixels are arranged so as to form a plurality of rows, and
wherein the at least one pixel is a pixel arranged in a same row among the plurality of rows, and the transfer at the third time and the transfer at the fourth time are continuously performed without performing the transfer to the pixels in the other rows during a period between the transfer at the third time and the transfer at the fourth time.

12. The image pickup apparatus according to claim 1, further comprising:
a signal processing circuit configured to process a signal based on the charges transferred at the third time by using a signal based on the charges transferred at the fourth time.

13. The image pickup apparatus according to claim 12,
wherein, while a time when the second transfer switch in the at least one pixel is controlled to be in the off state after the third time is set as a fifth time, and
a time when the second transfer switch in the at least one pixel is controlled to be in the off state after the fourth time is set as a sixth time,
the signal processing circuit performs the processing by further using a time ratio of a length of a period from the sixth time in a previous frame to the fifth time to a length of a period from the fifth time to the sixth time.

14. An image pickup system comprising:
an image pickup apparatus including
a plurality of pixels, each of the plurality of pixels including
a photoelectric conversion unit configured to perform accumulation of charges generated by incident light,
a holding unit configured to hold the charges,
an amplification unit configured to output a signal based on the charges,
a first transfer switch configured to transfer the charges from the photoelectric conversion unit to the holding unit, and
a second transfer switch configured to transfer the charges from the holding unit to the amplification unit; and
a signal processing unit configured to process a signal output from the image pickup apparatus,
wherein the photoelectric conversion unit in each of the plurality of pixels starts the accumulation of the charges at a first time,
wherein the first transfer switch in each of the plurality of pixels is controlled to be turned on after the first time and to be thereafter turned off at a second time to transfer the charges accumulated in the photoelectric conversion unit to the holding unit,
wherein the second transfer switch in at least one pixel among the plurality of pixels is controlled to be turned on at a third time after the second time to transfer the charges held in the holding unit to the amplification unit,
wherein the second transfer switch in the at least one pixel is controlled to be turned on at a fourth time after the third time to transfer the charges held in the holding unit to the amplification unit, and
wherein the first transfer switch in the at least one pixel is maintained to be in an off state during a period from the third time to the fourth time.

15. An image pickup system comprising:
an image pickup apparatus including
a plurality of pixels, each of the plurality of pixels including
a photoelectric conversion unit configured to perform accumulation of charges generated by incident light,
a holding unit configured to hold the charges,
an amplification unit configured to output a signal based on the charges,
a first transfer switch configured to transfer the charges from the photoelectric conversion unit to the holding unit, and
a second transfer switch configured to transfer the charges from the holding unit to the amplification unit; and
a signal processing unit configured to process a signal output from the image pickup apparatus,
wherein the photoelectric conversion unit in each of the plurality of pixels starts the accumulation of the charges at a first time, wherein the first transfer switch in each of the plurality of pixels is controlled to be turned on after the first time and to be thereafter turned off at a second time to transfer the charges accumulated in the photoelectric conversion unit to the holding unit, wherein the second transfer switch in at least one pixel among the plurality of pixels is controlled to be turned on at a third time after the second time to transfer the charges held in the holding unit to the amplification unit, wherein the second transfer switch in the at least one pixel is controlled to be turned on at a fourth time after the third time to transfer the charges held in the holding unit to the amplification unit, wherein the first transfer switch in the at least one pixel is maintained to be in an off state during a period from the third time to the fourth time, and wherein the signal processing unit processes a signal based on the charges transferred at the third time by using a signal based on the charges transferred at the fourth time.

16. The image pickup system according to claim 15, wherein, while a time when the second transfer switch in the at least one pixel is controlled to be in the off state after the third time is set as a fifth time, and a time when the second transfer switch in the at least one pixel is controlled to be in the off state after the fourth time is set as a sixth time, a signal processing circuit performs the processing by further using a time ratio of a length of a period from the sixth time in a previous frame to the fifth time to a length of a period from the fifth time to the sixth time.

17. A control method for an image pickup apparatus that includes a plurality of pixels, each of the plurality of pixels including a photoelectric conversion unit configured to perform accumulation of charges generated by incident light, a holding unit configured to hold the charges, an amplification unit configured to output a signal based on the charges, a first transfer switch configured to transfer the charges from the photoelectric conversion unit to the holding unit, and a second transfer switch configured to transfer the charges from the holding unit to the amplification unit, the control method comprising:

starting the accumulation of the charges at a first time by the photoelectric conversion unit in each of the plurality of pixels;

controlling the first transfer switch in each of the plurality of pixels to be turned on after the first time and to be thereafter turned off at a second time to transfer the charges accumulated in the photoelectric conversion unit to the holding unit;

controlling the second transfer switch in at least one pixel among the plurality of pixels to be turned on at a third time after the second time to transfer the charges held in the holding unit to the amplification unit;

controlling the second transfer switch in the at least one pixel to be turned on at a fourth time after the third time to transfer the charges held in the holding unit to the amplification unit; and maintaining the first transfer switch in the at least one pixel to be in an off state during a period from the third time to the fourth time.

* * * * *